US 12,405,377 B2

(12) United States Patent
Kaizu et al.

(10) Patent No.: US 12,405,377 B2
(45) Date of Patent: Sep. 2, 2025

(54) SIGNAL PROCESSING DEVICE, SIGNAL PROCESSING METHOD, AND DISTANCE-MEASURING MODULE

(71) Applicants: SONY GROUP CORPORATION, Tokyo (JP); SONY SEMICONDUCTOR SOLUTIONS CORPORATION, Kanagawa (JP)

(72) Inventors: Shun Kaizu, Kanagawa (JP); Hajime Mihara, Tokyo (JP); Takuro Kamiya, Kanagawa (JP); Shuntaro Aotake, Kanagawa (JP)

(73) Assignees: SONY GROUP CORPORATION, Tokyo (JP); SONY SEMICONDUCTOR SOLUTIONS CORPORATION, Kanagawa (JP)

(*) Notice: Subject to any disclaimer, the term of this patent is extended or adjusted under 35 U.S.C. 154(b) by 1010 days.

(21) Appl. No.: 17/599,218

(22) PCT Filed: Mar. 19, 2020

(86) PCT No.: PCT/JP2020/012199
§ 371 (c)(1),
(2) Date: Sep. 28, 2021

(87) PCT Pub. No.: WO2020/203331
PCT Pub. Date: Oct. 8, 2020

(65) Prior Publication Data
US 2022/0179072 A1    Jun. 9, 2022

(30) Foreign Application Priority Data

Apr. 5, 2019 (JP) .................. 2019-072688

(51) Int. Cl.
*G01C 3/08* (2006.01)
*G01S 13/89* (2006.01)
(Continued)

(52) U.S. Cl.
CPC .............. *G01S 17/32* (2013.01); *G01S 13/89* (2013.01); *G01S 13/93* (2013.01)

(58) Field of Classification Search
CPC .......... G01S 17/32; G01S 13/89; G01S 13/93; H04N 23/73
See application file for complete search history.

(56) References Cited

U.S. PATENT DOCUMENTS 4,651,001 A * 3/1987 Harada ................ H10F 39/157
250/370.06
8,786,678 B2  7/2014 Schmidt et al.
(Continued)

FOREIGN PATENT DOCUMENTS

CN    102004254 A    4/2011
CN    102694998 A    9/2012
(Continued)

OTHER PUBLICATIONS

Gan Xiaochuan, et al., "Calibration Status Analysis of Large Scale Measurement System Measurement Capability for Moving Target", Metrology &Measurement Technology, vol. 38, No. 05, Oct. 31, 2018, pp. 33-38.
(Continued)

*Primary Examiner* — Mark Hellner
(74) *Attorney, Agent, or Firm* — Paratus Law Group, PLLC

(57) ABSTRACT

There is provided a signal processing device, a signal processing method, and a distance-measuring module that allow improvement in distance measurement accuracy. The signal processing device includes an estimation unit that estimates, in a pixel including a first tap that detects a charge photoelectrically converted by a photoelectric conversion unit and a second tap that detects the charge photoelectrically converted by the photoelectric conversion unit, a sensitivity difference between taps of the first tap and the (Continued)

second tap by using first to fourth detection signals obtained by detecting reflected light generated by emission light reflected by an object in first to fourth phases with respect to the emission light. The present technology can be applied to, for example, a distance-measuring module that performs distance measurement by the indirect ToF method, and the like.

12 Claims, 19 Drawing Sheets

(51) Int. Cl.
  *G01S 17/32* (2020.01)
  *G01S 13/93* (2020.01)

(56) References Cited

U.S. PATENT DOCUMENTS

| | | |
|---|---|---|
| 2012/0173184 A1 | 7/2012 | Ovsiannikov et al. |
| 2012/0176476 A1 | 7/2012 | Schmidt |
| 2013/0083001 A1 | 4/2013 | Jeong |
| 2013/0258099 A1 | 10/2013 | Ovsiannikov |
| 2015/0146089 A1* | 5/2015 | Ovsiannikov ........... G01S 17/89 |
| | | 348/362 |
| 2018/0348369 A1 | 12/2018 | Ohki |

FOREIGN PATENT DOCUMENTS

| | | | |
|---|---|---|---|
| JP | 2007078424 A | 3/2007 | |
| JP | 2013205723 A | 10/2013 | |
| JP | 2017-150893 A | 8/2017 | |
| JP | 2012234921 A * | 11/2019 | ........... H01L 27/148 |
| WO | WO 2019/054099 A1 | 3/2019 | |

OTHER PUBLICATIONS

Mirko Schmidt et al., High Frame Rate for 3D Time-of-Flight Cameras by Dynamic Sensor Calibration, 2011 IEEE International Conference on Computational Photography, Apr. 8-10, 2011, pp. 1-8, IEEE.

Shuixing, Li et al., "Highly Efficient Fullerene-Free Organic Solar Cells Operate at Near Zero Highest Occupied Molecular Orbital Offsets", Journal of the American Chemical Society, vol. 141, No. 7 Mar. 18, 2019, pp. 3073-3082 1-10.

* cited by examiner

FIG. 11
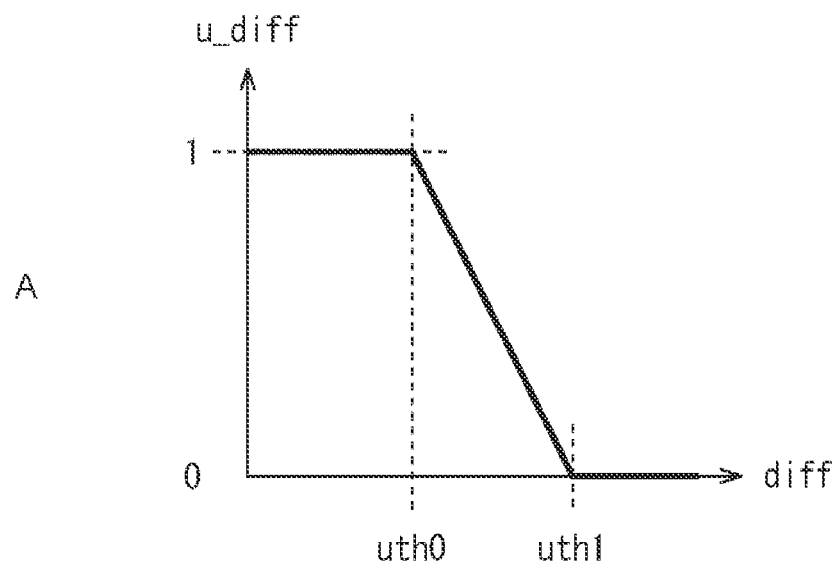
A
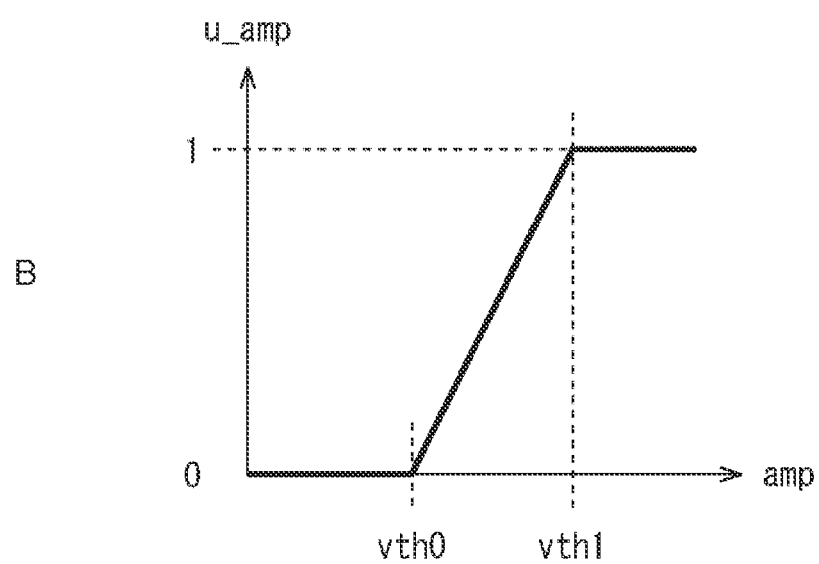
B

SIGNAL PROCESSING DEVICE, SIGNAL PROCESSING METHOD, AND DISTANCE-MEASURING MODULE

CROSS REFERENCE TO PRIOR APPLICATION

This application is a National Stage Patent Application of PCT International Patent Application No. PCT/JP2020/012199 (filed on Mar. 19, 2020) under 35 U.S.C. § 371, which claims priority to Japanese Patent Application No. 2019-072688 (filed on Apr. 5, 2019), which are all hereby incorporated by reference in their entirety.

TECHNICAL FIELD

The present technology relates to a signal processing device, a signal processing method, and a distance-measuring module, and in particular to a signal processing device, a signal processing method, and a distance-measuring module that allow improvement in distance-measuring accuracy.

BACKGROUND ART

In recent years, because of an advance in the semiconductor technology, distance-measuring modules that measure the distance to an object have become increasingly small. Therefore, for example, it has been implemented to mount a distance-measuring module in a mobile terminal such as a so-called smartphone, which is a small information processing device equipped with a communication function.

Examples of a distance measuring method in the distance-measuring module include the indirect time of flight (ToF) method, the structured light method, and the like. The indirect ToF method includes emitting light toward an object, detecting light reflected from a surface of the object, and calculating the distance to the object on the basis of a measured value obtained by measuring the time of flight of the light. The structured light method includes emitting pattern light toward an object and calculating the distance to the object on the basis of an image obtained by capturing distortion of the pattern on the surface of the object.

For example, Patent Document 1 discloses a technology for accurately measuring a distance by determining movement of an object within a detection period with the distance-measuring module for distance measurement by the indirect ToF method.

CITATION LIST

Patent Document

Patent Document 1: Japanese Patent Application Laid-Open No. 2017-150893

SUMMARY OF THE INVENTION

Problems to be Solved by the Invention

In the distance-measuring module of the indirect ToF method, further improvement in distance measurement accuracy is required.

The present disclosure has been made in view of such a situation, and makes it possible to improve the distance measurement accuracy.

Solutions to Problems

A signal processing device according to a first aspect of the present technology includes an estimation unit that estimates, in a pixel including a first tap that detects a charge photoelectrically converted by a photoelectric conversion unit and a second tap that detects the charge photoelectrically converted by the photoelectric conversion unit, a sensitivity difference between taps of the first tap and the second tap by using first to fourth detection signals obtained by detecting reflected light generated by emission light reflected by an object in first to fourth phases with respect to the emission light.

A signal processing method according to a second aspect of the present technology includes, by a signal processing device, estimating, in a pixel including a first tap that detects a charge photoelectrically converted by a photoelectric conversion unit and a second tap that detects the charge photoelectrically converted by the photoelectric conversion unit, a sensitivity difference between taps of the first tap and the second tap by using first to fourth detection signals obtained by detecting reflected light generated by emission light reflected by an object in first to fourth phases with respect to the emission light.

A distance-measuring module according to a third aspect of the present technology includes: a light-receiving unit in which pixels each including a first tap that detects a charge photoelectrically converted by a photoelectric conversion unit and a second tap that detects the charge photoelectrically converted by the photoelectric conversion unit are two-dimensionally arranged; and a signal processing unit including an estimation unit that estimates a sensitivity difference between taps of the first tap and the second tap in the pixels by using first to fourth detection signals obtained by detecting reflected light generated by emission light reflected by an object in first to fourth phases with respect to the emission light.

According to the first to third aspects of the present technology, in a pixel including a first tap that detects a charge photoelectrically converted by a photoelectric conversion unit and a second tap that detects the charge photoelectrically converted by the photoelectric conversion unit, a sensitivity difference between taps of the first tap and the second tap is estimated by using first to fourth detection signals obtained by detecting reflected light generated by emission light reflected by an object in first to fourth phases with respect to the emission light.

The signal processing device and the distance-measuring module may be independent devices or modules incorporated in another device.

BRIEF DESCRIPTION OF DRAWINGS

FIG. 11 is a diagram for describing the blend rate of coefficient updates based on the movement amount and amplitude.

MODE FOR CARRYING OUT THE INVENTION

Figure 1:
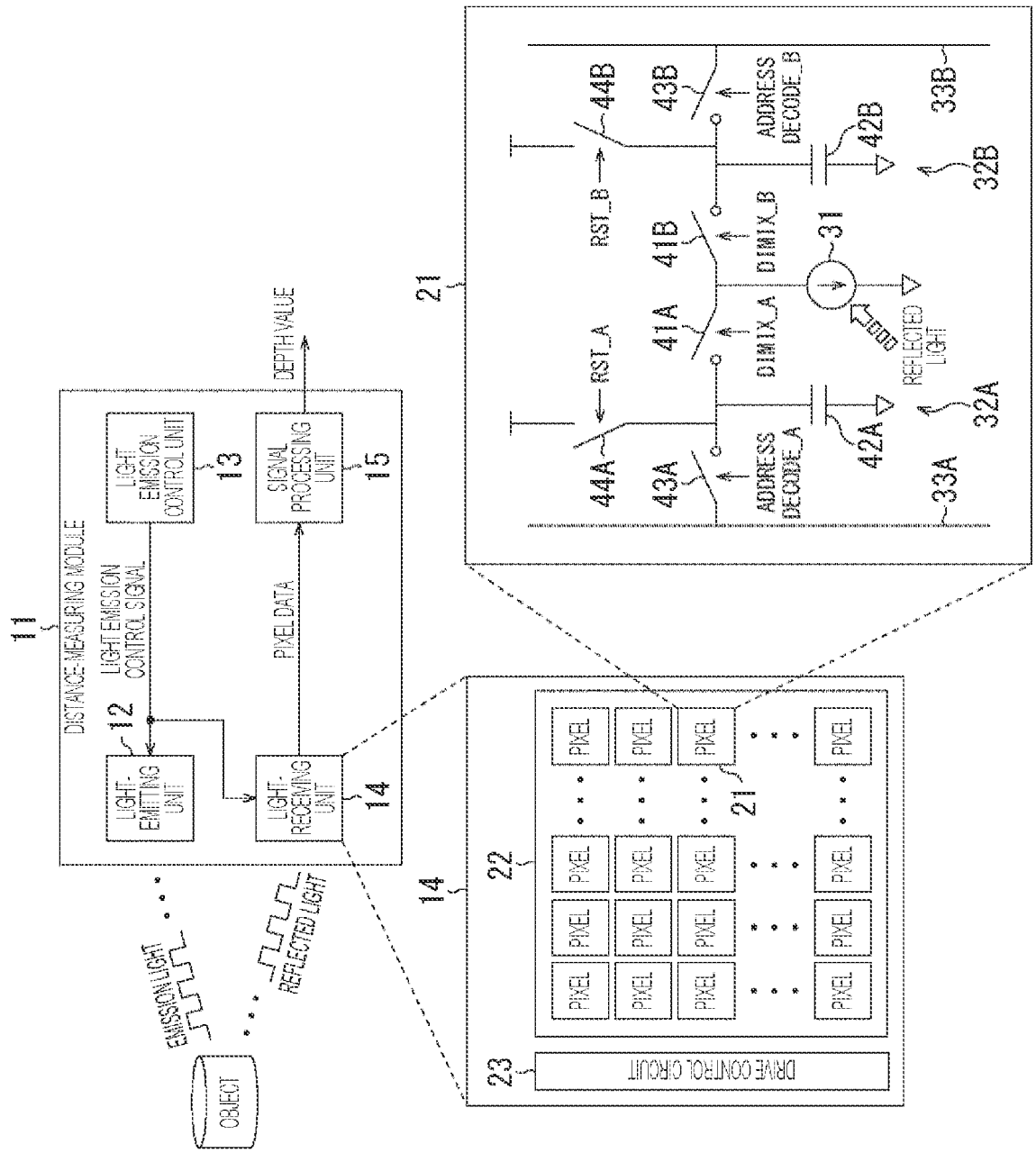
FIG. 1 is a block diagram showing a configuration example of one embodiment of a distance-measuring module to which the present technology is applied.

A mode for carrying out the present technology (hereinafter referred to as an embodiment) will be described below. Note that the description will be made in the following order.
1. Configuration example of distance-measuring module
2. Pixel operation of indirect ToF method
3. Output timing of depth map
4. Detailed configuration example of signal processing unit
5. Depth value calculation processing of signal processing unit
6. Modifications of driving by distance-measuring module
7. Configuration example of electronic device
8. Configuration example of computer
9. Example of application to mobile object <1. Configuration Example of Distance-Measuring Module>

FIG. 1 is a block diagram showing a configuration example of one embodiment of a distance-measuring module to which the present technology is applied.

The distance-measuring module 11 shown in FIG. 1 is a distance-measuring module that measures a distance by the indirect ToF method, and includes a light-emitting unit 12, a light emission control unit 13, a light-receiving unit 14, and a signal processing unit 15. The distance-measuring module 11 emits light to an object and receives light (reflected light) obtained by the light (emission light) reflected by the object, thereby measuring a depth value as distance information to the object and outputting a depth map.

The light-emitting unit 12 includes, for example, an infrared laser diode and the like as a light source, emits light while performing modulation at timing according to a light emission control signal supplied from the light emission control unit 13 according to control by the light emission control unit 13, and emits emission light to the object.

The light emission control unit 13 supplies the light emission control signal having a predetermined frequency (for example, 20 MHz and the like) to the light-emitting unit 12, thereby controlling the light emission of the light-emitting unit 12. Furthermore, in order to drive the light-receiving unit 14 in accordance with the timing of light emission in the light-emitting unit 12, the light emission control unit 13 also supplies the light emission control signal to the light-receiving unit 14.

In the light-receiving unit 14, a pixel array unit 22 is provided in which pixels 21 that each generate a charge according to a received light amount and output a signal according to the charge are two-dimensionally arranged in a matrix in the row direction and the column direction, and a drive control circuit 23 is disposed in a peripheral region of the pixel array unit 22.

The light-receiving unit 14 receives the reflected light from the object by using the pixel array unit 22 in which the plurality of pixels 21 is two-dimensionally arranged. Then, the light-receiving unit 14 supplies the signal processing unit 15 with pixel data including detection signals according to the received light amount of the reflected light received by each pixel 21 of the pixel array unit 22.

Figure 16:
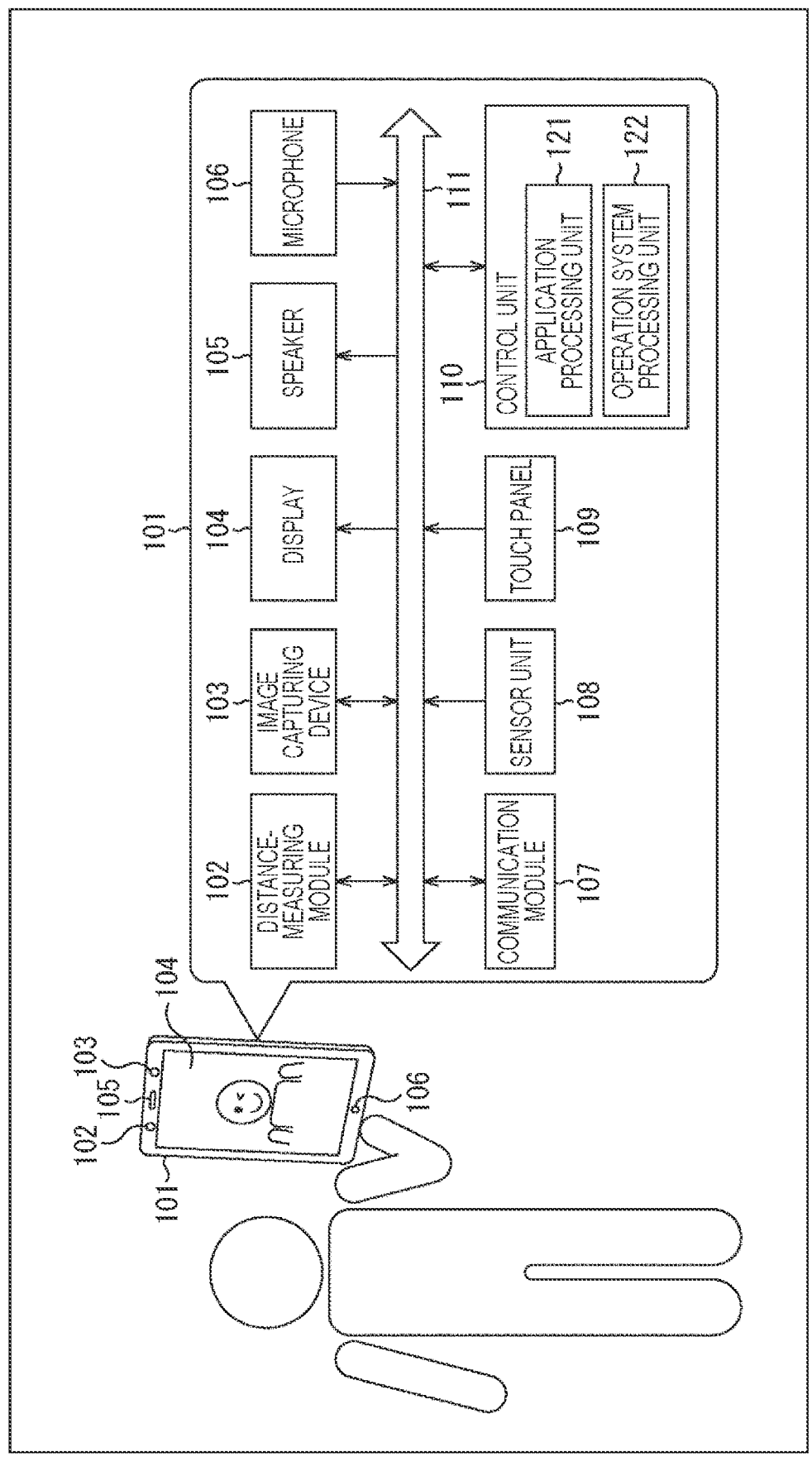
FIG. 16 is a block diagram showing a configuration example of an electronic device to which the present technology is applied.

The signal processing unit 15 calculates the depth value, which is the distance from the distance-measuring module 11 to the object, for each pixel 21 of the pixel array unit 22 on the basis of the pixel data supplied from the light-receiving unit 14, and outputs the depth value to a subsequent control unit (for example, application processing unit 121, operation system processing unit 122, and the like of FIG. 16). Alternatively, the signal processing unit 15 may generate the depth map in which the depth value is stored as a pixel value of each pixel 21 of the pixel array unit 22, and output the depth map to the subsequent stage. Note that the detailed configuration of the signal processing unit 15 will be described later with reference to FIG. 7.

The drive control circuit 23 outputs a control signal for controlling driving of the pixel 21 (for example, distribution signal DIMIX, selection signal ADDRESS DECODE, reset signal RST, and the like to be described later), for example, on the basis of the light emission control signal supplied from the light emission control unit 13, and the like.

The pixel 21 includes a photodiode 31, and a first tap 32A and a second tap 32B that detect the charge photoelectrically converted by the photodiode 31. In the pixel 21, the charge generated by one photodiode 31 is distributed to the first tap 32A or the second tap 32B. Then, out of the charge generated by the photodiode 31, the charge distributed to the first tap 32A is output from a signal line 33A as a detection signal A, and the charge distributed to the second tap 32B is output from a signal line 33B as a detection signal B.

The first tap 32A includes a transfer transistor 41A, a floating diffusion (FD) unit 42A, a selection transistor 43A, and a reset transistor 44A. Similarly, the second tap 32B includes a transfer transistor 41B, an FD unit 42B, a selection transistor 43B, and a reset transistor 44B.

<2. Pixel Operation of Indirect ToF Method>

The operation of the pixel 21 by the indirect ToF method will be described with reference to FIG. 2.

Figure 2:
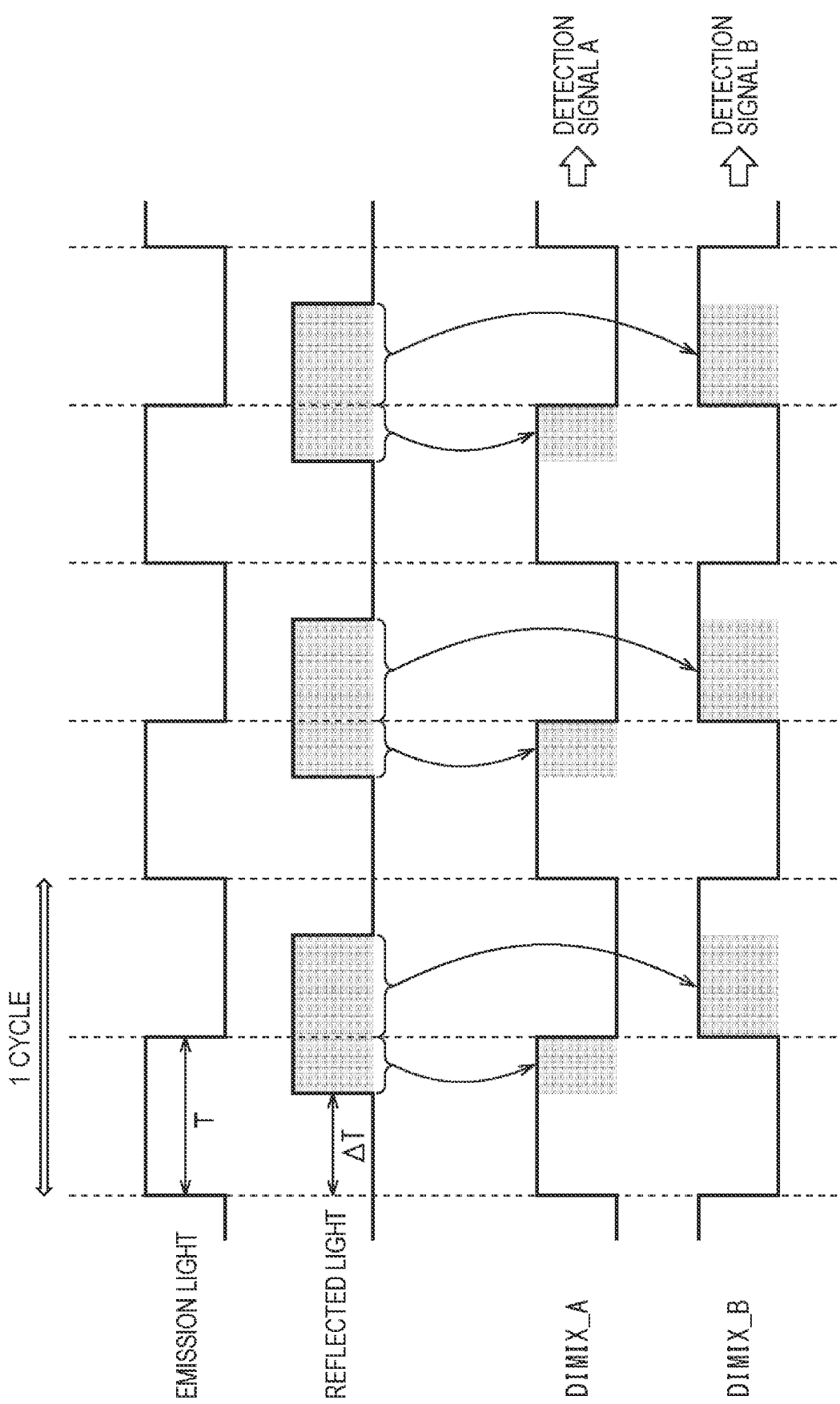
FIG. 2 is a diagram for describing an operation of a pixel in an indirect ToF method.

As shown in FIG. 2, the emission light modulated to repeat emission on/off at emission time T (1 cycle=2T) is output from the light-emitting unit 12, and the reflected light is received by the photodiode 31 with delay time ΔT according to the distance to the object. Furthermore, the distribution signal DIMIX_A controls on/off of the transfer transistor 41A, and the distribution signal DIMIX_B controls on/off of the transfer transistor 41B. The distribution signal DIMIX_A is a signal having the same phase as the emission light, and the distribution signal DIMIX_B has a phase obtained by inverting the distribution signal DIMIX_A.

Therefore, the charge generated when the photodiode 31 receives the reflected light is transferred to the FD unit 42A while the transfer transistor 41A is on in response to the distribution signal DIMIX_A, and is transferred to the FD unit 42B while the transfer transistor 41B is on in response to the distribution signal DIMIX_B. With this configuration, in a predetermined period in which the emission of the emission light of the emission time T is periodically performed, the charge transferred via the transfer transistor 41A is sequentially accumulated in the FD unit 42A, and the charge transferred via the transfer transistor 41B is sequentially accumulated in the FD unit 42B.

Then, after the period for accumulating the charge is finished, when the selection transistor 43A is turned on in response to the selection signal ADDRESS DECODE_A, the charge accumulated in the FD unit 42A is read via the signal line 33A, and the detection signal A according to the charge amount is output from the light-receiving unit 14. Similarly, when the selection transistor 43B is turned on in response to the selection signal ADDRESS DECODE_B, the charge accumulated in the FD unit 42B is read via the signal line 33B, and the detection signal B according to the charge amount is output from the light-receiving unit 14. Furthermore, the charge accumulated in the FD unit 42A is discharged when the reset transistor 44A is turned on in response to the reset signal RST_A, and the charge accumulated in the FD unit 42B is discharged when the reset transistor 44B is turned on in response to the reset signal RST_B.

In this way, the pixel 21 distributes the charge generated by the reflected light received by the photodiode 31 to the first tap 32A or the second tap 32B according to the delay time ΔT, and outputs the detection signal A and the detection signal B. Then, the delay time ΔT corresponds to the time during which the light emitted by the light-emitting unit 12 flies to the object, is reflected by the object, and then flies to the light-receiving unit 14, that is, corresponds to the distance to the object. Therefore, the distance-measuring module 11 can obtain the distance to the object (depth value) according to the delay time ΔT on the basis of the detection signal A and the detection signal B.

However, in the pixel array unit 22, because of discrepancy in characteristics (sensitivity difference) of each element of the pixel transistor of the individual pixel 21 including the photodiode 31, the transfer transistor 41, and the like, influences different from pixel 21 to pixel 21 may be exerted on the detection signal A and the detection signal B. Therefore, the distance-measuring module 11 of the indirect ToF method adopts a method of removing the sensitivity difference between taps as fixed pattern noise of each pixel and improving the SN ratio by acquiring the detection signal A and the detection signal B obtained by receiving the reflected light by the same pixel 21 with phases changed.

As a method of receiving reflected light by changing the phase and calculating the depth value, for example, the detection method by 2 phase (2-phase method) and the detection method by 4 phase (4-phase method) will be described.

Figure 3:
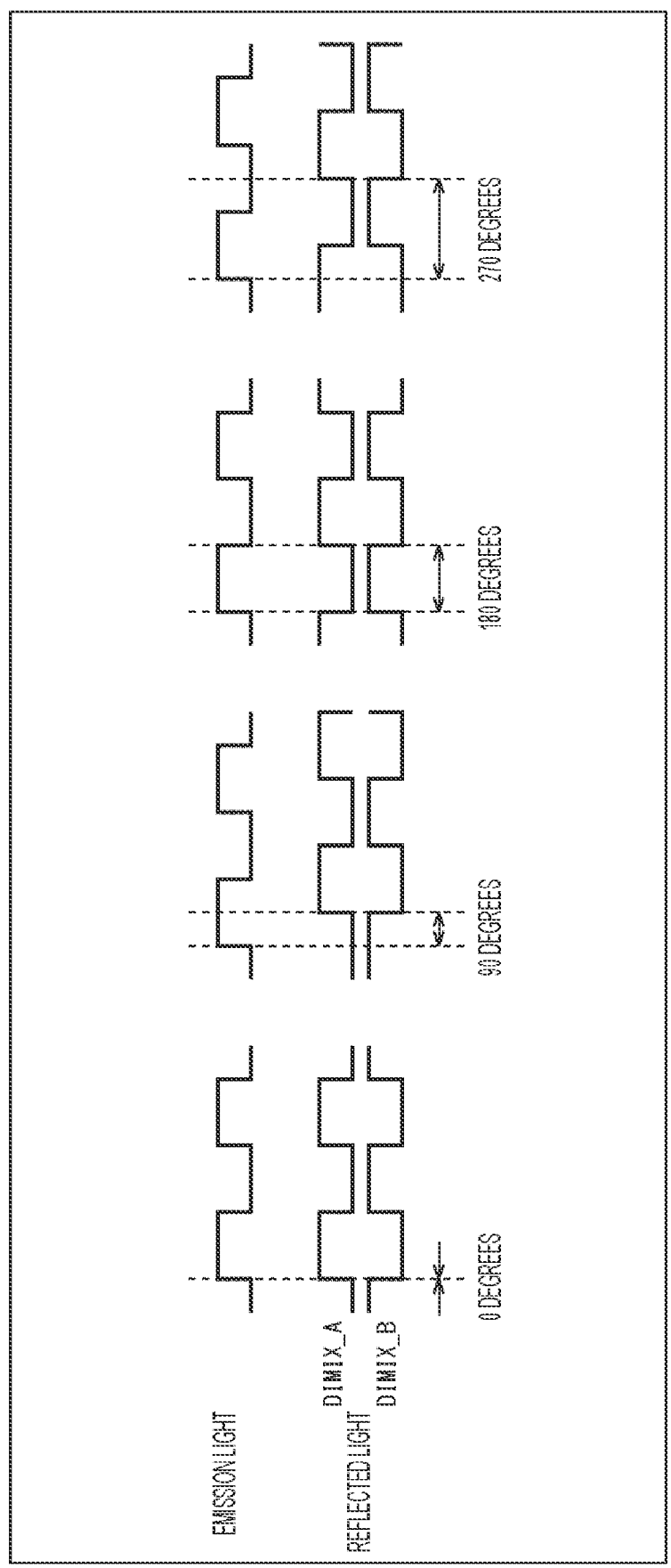
FIG. 3 is a diagram for describing a detection method by 4 phase.

As shown in FIG. 3, the light-receiving unit 14 receives the reflected light at reception timing with the phase shifted by 0°, 90°, 180°, and 270° with respect to the emission timing of the emission light. More specifically, the light-receiving unit 14 receives the reflected light by changing the phase in a time division manner, such as receiving light with the phase set at 0° with respect to the emission timing of the emission light in one frame period, receiving light with the phase set at 90° in the next frame period, receiving light with the phase set at 180° in the next frame period, and receiving light with the phase set at 270° in the next frame period.

Figure 4:
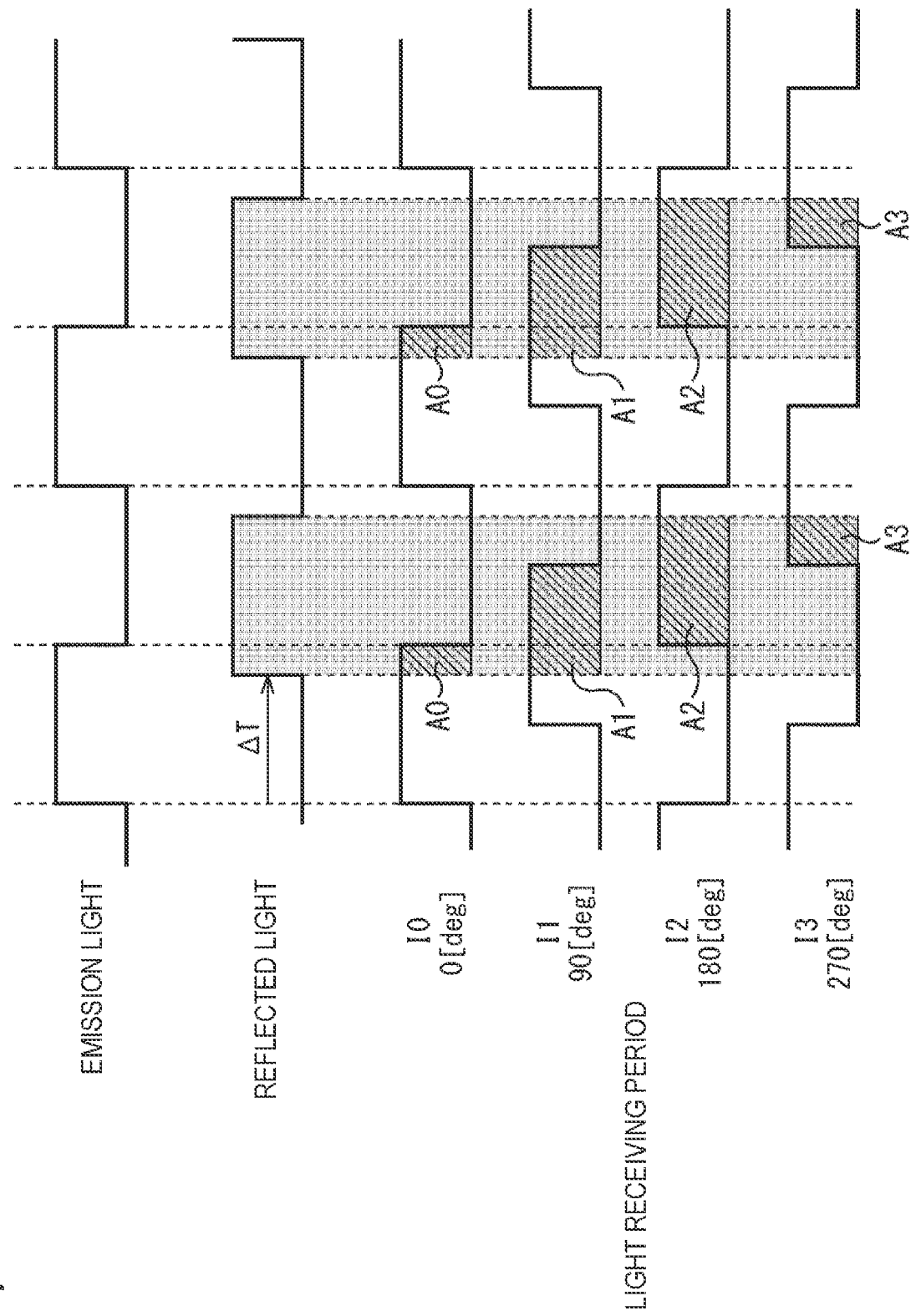
FIG. 4 is a diagram for describing the detection method by 4 phase.

FIG. 4 is a diagram showing the light receiving period (exposure period) of the first tap 32A of the pixel 21, one above the other, in each phase of 0°, 90°, 180°, and 270° to make the phase difference easy to understand.

As shown in FIG. 4, in the first tap 32A, the detection signal A obtained by receiving light in the same phase as the emission light (phase 0°) is called detection signal A0, the detection signal A obtained by receiving light in the phase shifted by 90 degrees from the emission light (phase 90°) is called detection signal A1, the detection signal A obtained by receiving light in the phase shifted by 180 degrees from the emission light (phase 180°) is called detection signal A2, and the detection signal A obtained by receiving light in the phase shifted by 270 degrees from the emission light (phase 270°) is called detection signal A3.

Furthermore, although illustration is omitted, in the second tap 32B, the detection signal B obtained by receiving light in the same phase as the emission light (phase 0°) is called detection signal B0, the detection signal B obtained by receiving light in the phase shifted by 90 degrees from the emission light (phase 90°) is called detection signal B1, the detection signal B obtained by receiving light in the phase shifted by 180 degrees from the emission light (phase 180°) is called detection signal B2, and the detection signal B obtained by receiving light in the phase shifted by 270 degrees from the emission light (phase 270°) is called detection signal B3.

Figure 5:
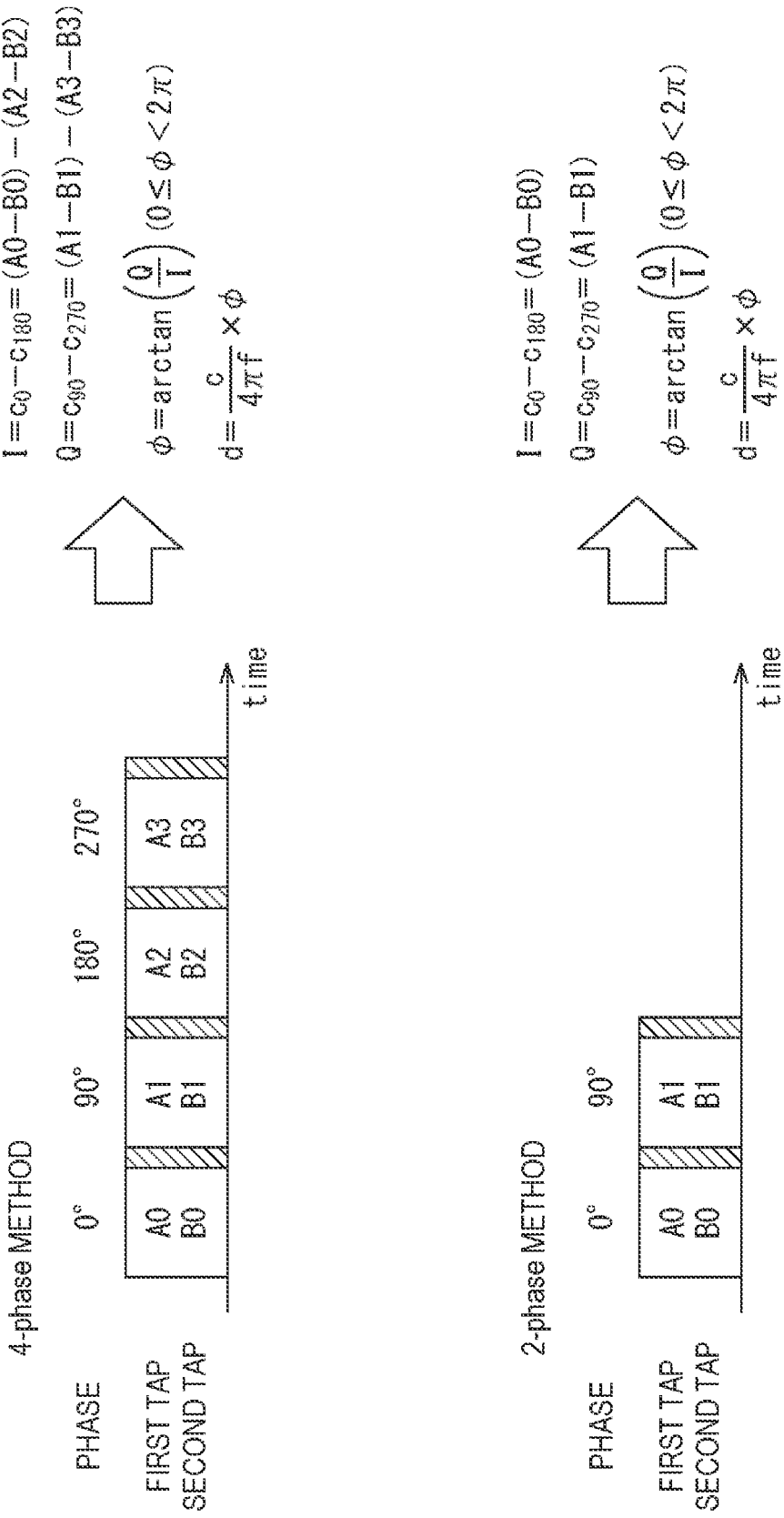
FIG. 5 is a diagram for describing a method of calculating a depth value by the 2-phase method and the 4-phase method.

FIG. 5 is a diagram for describing a method of calculating a depth value d by the 2-phase method and the 4-phase method.

In the indirect ToF method, the depth value d can be obtained by the following Formula (1).

[Formula 1]

$$d = \frac{c \cdot \Delta T}{2} = \frac{c \cdot \phi}{4\pi f} \tag{1}$$

In Formula (1), c is the speed of light, ΔT is the delay time, and f is the modulation frequency of light. Furthermore, φ in Formula (1) represents the phase shift amount [rad] of the reflected light, and is represented by the following Formula (2).

[Formula 2]

$$\phi = \arctan\left(\frac{Q}{I}\right)(0 \leq \phi > 2\pi) \tag{2}$$

By the 4-phase method, I and Q of Formula (2) are calculated by the following Formula (3) by using the detection signals A0 to A3 and the detection signals B0 to B3 obtained by setting the phase at 0°, 90°, 180°, and 270°. I and Q are signals obtained by assuming that the luminance change in the emission light is a cos wave and converting the phase of the cos wave from polar coordinates to the rectangular coordinate system (IQ plane).

$$I = c_0 - c_{180} = (A0 - B0) - (A2 - B2)$$

$$Q = c_{90} - c_{270} = (A1 - B1) - (A3 - B3) \quad (3)$$

By the 4-phase method, for example, like "A0-A2" and "A1-A3" in Formula (3), by taking the difference between the detection signals of opposite phases in the same pixel, it is possible to eliminate characteristic variation between taps existing in each pixel, that is, fixed pattern noise.

Meanwhile, by the 2-phase method, the depth value d to the object can be obtained by using only two phases orthogonal to each other among the detection signals A0 to A3 and the detection signals B0 to B3 obtained by setting the phase at 0°, 90°, 180°, and 270°. For example, in a case where the detection signals A0 and B0 in phase 0° and the detection signals A1 and B1 in phase 90° are used, I and Q of Formula (2) are the following Formula (4).

$$I = c_0 - c_{180} = (A0 - B0)$$

$$Q = c_{90} - c_{270} = (A1 - B1) \quad (4)$$

For example, in a case where the detection signals A2 and B2 in phase 180° and the detection signals A3 and B3 in phase 270° are used, I and Q of Formula (2) are the following Formula (5).

$$I = c_0 - c_{180} = -(A2 - B2)$$

$$Q = c_{90} - c_{270} = -(A3 - B3) \quad (5)$$

The 2-phase method cannot eliminate the characteristic variation between taps existing in each pixel, but the depth value d to the object can be obtained only from the detection signals of two phases, and therefore it is possible to measure the distance at a frame rate twice that of the 4-phase method.

The signal processing unit 15 of the distance-measuring module 11 performs signal processing for appropriately selecting or blending, according to movement of the object or the like, the I signal and the Q signal corresponding to the delay time ΔT calculated by the 4-phase method, and the I signal and the Q signal corresponding to the delay time ΔT calculated by the 2-phase method, calculates the depth value d by using the result, and outputs the depth map.

<3. Output Timing of Depth Map>

Next, output timing of the depth map generated by the distance-measuring module 11 will be described.

Figure 6:
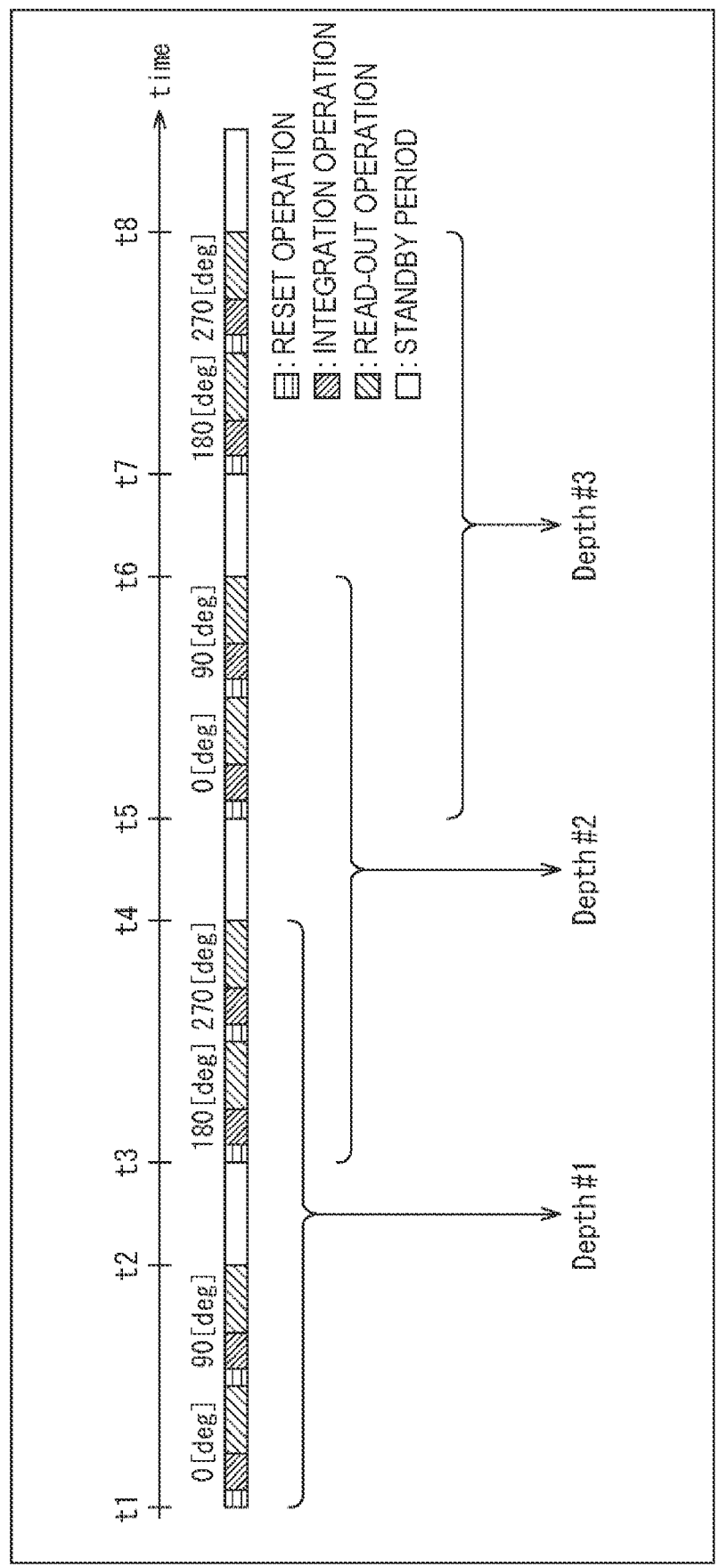
FIG. 6 is a diagram for describing driving of a light-receiving unit of the distance-measuring module and output timing of a depth map.

FIG. 6 is a diagram showing driving of the light-receiving unit 14 of the distance-measuring module 11 and the output timing of the depth map.

As described above, the light-receiving unit 14 of the distance-measuring module 11 is driven to receive the reflected light by changing the phase in the order of phase 0°, phase 90°, phase 180°, and phase 270° in a time division manner, and is driven continuously with two phases for calculating the depth value d by the 2-phase method as one set.

That is, as shown in FIG. 6, the light-receiving unit 14 continuously receives light in phase 0° and light in phase 90° from time t1. After the standby period from time t2 to time t3, the light-receiving unit 14 continuously receives light in phase 180° and light in phase 270° from time t3. Next, after the predetermined standby period from time t4 to time t5, the light-receiving unit 14 continuously receives light in phase 180° and light in phase 270° from time t5. After the standby period from time t6 to time t7, the light-receiving unit 14 continuously receives light in phase 0° and light in phase 90° from time t7.

The light receiving operation in each phase includes a reset operation of turning on the reset transistors 44A and 44B to reset the charge, an integration operation of accumulating the charge in the FD units 42A and 42B, and a read-out operation of reading the charge accumulated in the FD units 42A and 42B.

The signal processing unit 15 calculates the depth value by using the pixel data for four phases, and outputs the depth map in units of two phases.

Specifically, the signal processing unit 15 generates and outputs the depth map Depth #1 at time t4 by using the pixel data for four phases from time t1 to time t4. At the next time t6, the signal processing unit 15 generates and outputs the depth map Depth #2 by using the pixel data for four phases from time t3 to time t6. At the next time t8, the signal processing unit 15 generates and outputs the depth map Depth #3 by using the pixel data for four phases from time t5 to time t8.

By continuous driving with the two phases as one set in this way, in a case where the object is moving, an influence of movement of the object can be suppressed in the depth value calculated by the 2-phase method.

<4. Detailed Configuration Example of Signal Processing Unit>

Figure 7:
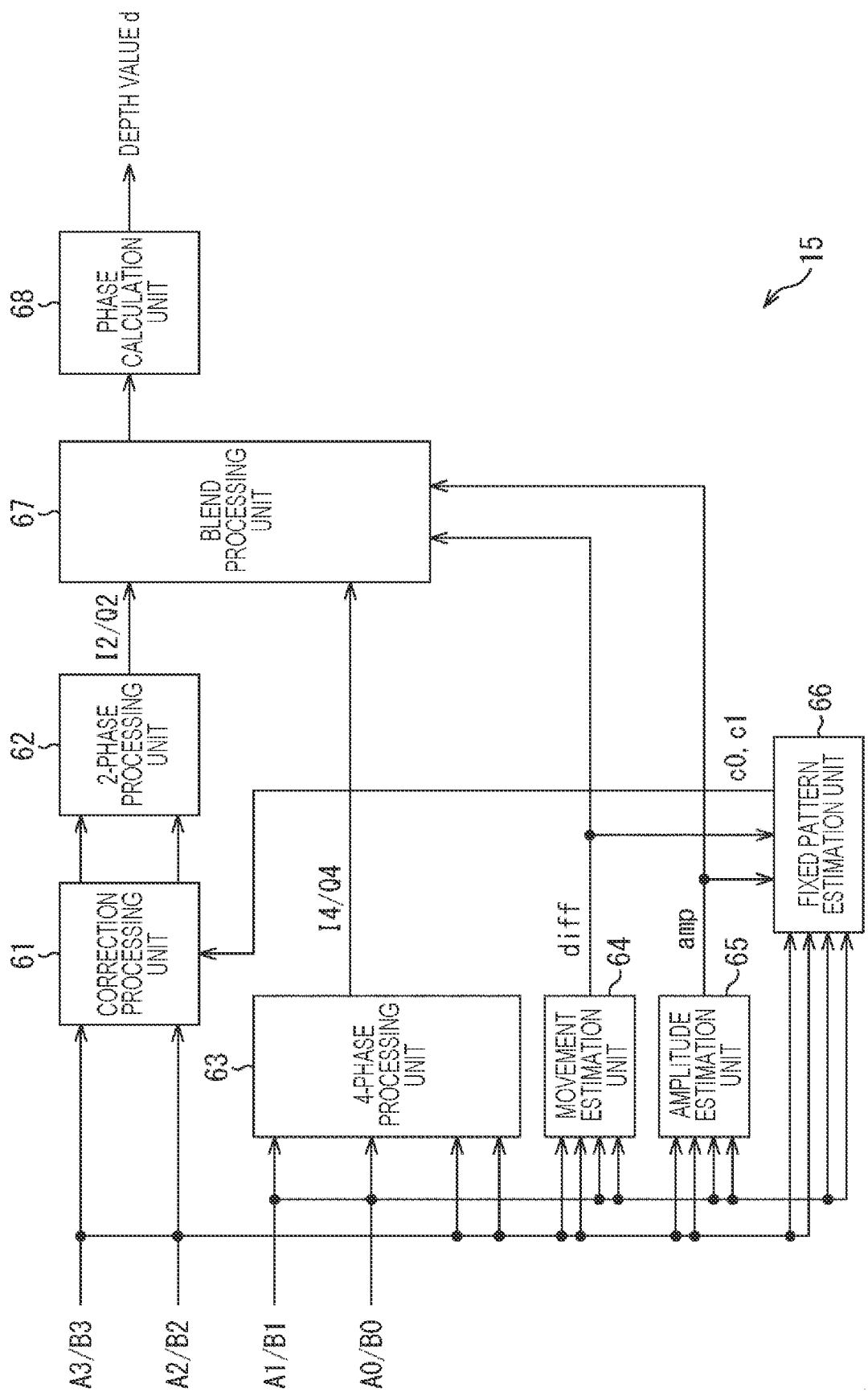
FIG. 7 is a block diagram showing a detailed configuration of a signal processing unit.

FIG. 7 is a block diagram showing a detailed configuration of the signal processing unit 15.

The signal processing unit 15 includes a correction processing unit 61, a 2-phase processing unit 62, a 4-phase processing unit 63, a movement estimation unit 64, an amplitude estimation unit 65, a fixed pattern estimation unit 66, a blend processing unit 67, and a phase calculation unit 68.

The signal processing unit 15 is sequentially supplied with the detection signals A0 to A3 and the detection signals B0 to B3 of each pixel of the pixel array unit 22 from the light-receiving unit 14. The detection signals A0 to A3 are the detection signals A obtained by sequentially setting the phase at 0°, 90°, 180°, and 270° in the first tap 32A. The detection signals B0 to B3 are the detection signals B obtained by sequentially setting the phase at 0°, 90°, 180°, and 270° in the second tap 32B.

As described with reference to FIG. 6, the signal processing unit 15 generates and outputs the depth map for each pixel by using the latest detection signals A0 to A3 and detection signals B0 to B3 in phase 0°, phase 90°, phase 180°, and phase 270°. A combination of the detection signals A0 to A3 and the detection signals B0 to B3 includes a case where the detection signal in two phases of phase 180° and phase 270° is the latest detection signal as shown in A of FIG. 8, and a case where the detection signal in two phases of phase 0° and phase 90° is the latest detection signal as shown in B of FIG. 8.

Figure 8:
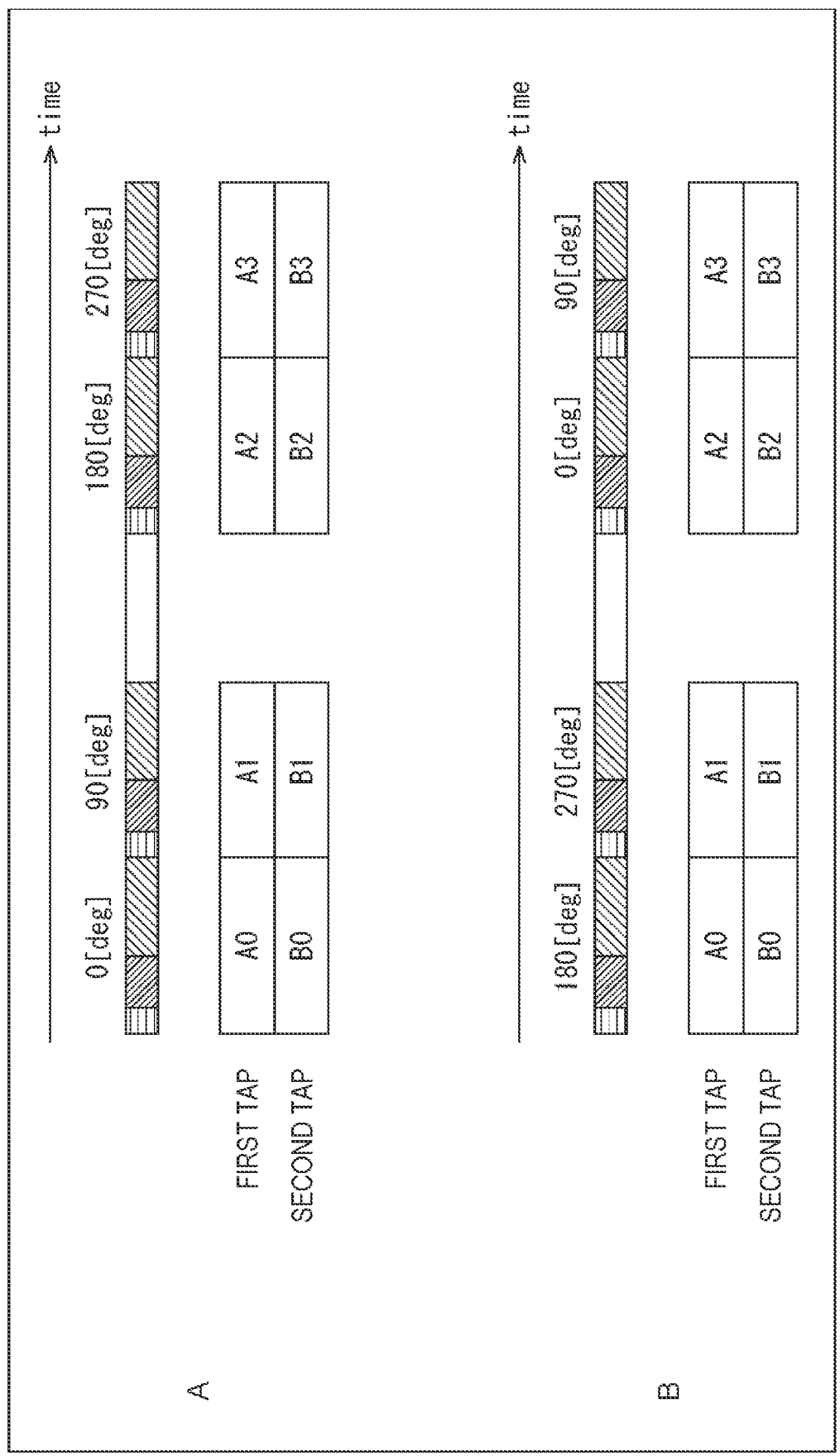
FIG. 8 is a diagram for describing detection signals of four phases.

In the following description, for simple description, each process of the signal processing unit 15 will be described by taking, for example, a case where the combination of the detection signals A0 to A3 and the detection signals B0 to B3 supplied from the light-receiving unit 14 to the signal processing unit 15 is that the detection signals in two phases of phase 180° and phase 270° shown in A of FIG. 8 are the latest detection signals.

Note that in a case where the detection signal in two phases of phase 0° and phase 90° is the latest detection signal, as shown in B of FIG. 8, similar processing can be performed by regarding the detection signal in phase 180°, phase 270°, phase 0°, and phase 90° as the detection signals A0 to A3 and the detection signals B0 to B3, and inverting the signs.

Returning to the description of FIG. 7, the signal processing unit 15 sequentially performs similar processing, for each pixel as the pixel to be processed, on the detection signals A0 to A3 and the detection signals B0 to B3 of each pixel of the pixel array unit 22 supplied from the light-receiving unit 14. Therefore, in the following, each process of the signal processing unit 15 will be described as the process of one pixel that is the pixel to be processed.

The detection signals A0 to A3 and the detection signals B0 to B3 of the predetermined pixel 21 as the pixel to be processed supplied from the light-receiving unit 14 to the signal processing unit 15 are supplied to the 4-phase processing unit 63, the movement estimation unit 64, the amplitude estimation unit 65, and the fixed pattern estimation unit 66. Furthermore, the latest detection signals A2, A3, B2, and B3 in two phases of phase 180° and phase 270° are supplied to the correction processing unit 61.

The correction processing unit 61 performs processing for correcting the characteristic variation (sensitivity difference) between taps of the detection signal A of the first tap 32A of the pixel to be processed and the detection signal B of the second tap 32B by using correction parameters supplied from the fixed pattern estimation unit 66.

In the present embodiment, the detection signal B of the second tap 32B of the pixel to be processed is matched with the detection signal A of the first tap 32A, and the correction processing unit 61 performs the following correction processing on each of the detection signals A (A2, A3) and B (B2, B3) in phase 180° and phase 270.

$$A' = A$$

$$B' = c0 + c1 \cdot B \quad (6)$$

Here, c0 and c1 are correction parameters supplied from the fixed pattern estimation unit 66, c0 represents an offset of the detection signal B with respect to the detection signal A, and c1 represents a gain of the detection signal B with respect to the detection signal A.

The detection signals A' and B' in Formula (6) represent the detection signals after the correction processing. Note that in the correction processing, the detection signal A of the first tap 32A can be matched with the detection signal B of the second tap 32B of the pixel to be processed, or may be matched with the middle of the detection signals A and B.

The correction processing unit 61 supplies the detection signals A2' and B2' in phase 180° and the detection signals A3' and B3' in phase 270° after the correction processing to the 2-phase processing unit 62.

The 2-phase processing unit 62 calculates the I signal and the Q signal of the 2-phase method by Formula (5) by using the detection signals A2' and B2' in phase 180° and the detection signals A3' and B3' in phase 270° from the correction processing unit 61.

Note that in the following, in order to distinguish from the I signal and the Q signal of the 4-phase method calculated by the 4-phase processing unit 63, the I signal and the Q signal of the 2-phase method are described as an I2 signal and a Q2 signal.

The 2-phase processing unit 62 supplies the I2 signal and the Q2 signal of the 2-phase method calculated by Formula (5) to the blend processing unit 67.

The 4-phase processing unit 63 calculates the I signal and the Q signal of the 4-phase method by Formula (3) by using the detection signals A0 to A3 and the detection signals B0 to B3 of the pixel to be processed supplied from the light-receiving unit 14. In the following, in order to distinguish from the I2 signal and the Q2 signal of the 2-phase method, the I signal and the Q signal of the 4-phase method are described as an I4 signal and a Q4 signal.

The 4-phase processing unit 63 supplies the I4 signal and the Q4 signal of the 4-phase method calculated by Formula (3) to the blend processing unit 67.

The movement estimation unit 64 estimates (calculates) a movement amount diff of the object between sets of the set of phase 0° and phase 90° and the set of phase 180° and phase 270° by using the detection signals A0 to A3 and the detection signals B0 to B3 of the pixel to be processed.

The movement estimation unit 64 can adopt either of the following diff0 to diff2 as the movement amount diff of the object between sets.

$$\text{diff0} = |(A0+B0+A1+B1)-(A2+B2+A3+B3)|$$

$$\text{diff1} = |(A0+B0)-(A2+B2)|+|(A1+B1)-(A3+B3)| \quad (7)$$

$$\text{diff2} = \text{sqrt}(|(A0+B0)-(A2+B2)|^2+|(A1+B1)-(A3+B3)|^2)$$

diff0 is a formula for calculating the movement amount from the difference in the sum of the I signal and the Q signal between sets. diff1 is a formula for calculating the movement amount from the difference in the I signal between sets. diff2 is a formula for calculating the movement amount from the distance between sets on the IQ plane. Which of the movement amounts diff0 to diff2 is adopted may be fixedly determined or may be selected (switched) with a setting signal and the like.

The movement estimation unit 64 supplies the estimated movement amount diff of the object to the fixed pattern estimation unit 66 and the blend processing unit 67.

The amplitude estimation unit 65 estimates (calculates) amplitude amp of the detection signal of the pixel to be processed supplied from the light-receiving unit 14. The amplitude here represents the difference in the detection signal between two phases caused by the modulated emission light. A large amplitude amp indicates that the emission light is sufficiently reflected from the object and is incident on the pixel to be processed. A small amplitude amp represents a large noise.

The amplitude estimation unit 65 can adopt either of the following amp0 to amp3 as the amplitude amp of the detection signal.

$$\text{amp0} = |A2-B2)-(A3-B3)|$$

$$\text{amp1} = \text{sqrt}(|(A2-B2)|^2+|(A3-B3)|^2)$$

$$\text{amp2} = |(A0-B0)-(A2-B2)|+|(A1-B1)-(A3-B3)|) \quad (8)$$

$$\text{amp3} = \text{sqrt}(|(A0-B0)-(A2-B2)|^2+|(A1-B1)-(A3-B3)|^2)$$

amp0 and amp1 are formulas for calculating the amplitude by using only the latest detection signals in two phases, that is, phase 180° and phase 270°. amp2 and amp3 are formulas for calculating the amplitude by using the latest detection signals in four phases, that is, phase 0°, phase 90°, phase 180°, and phase 270°.

The amplitude estimation unit 65 supplies the estimated amplitude amp of the detection signals to the fixed pattern estimation unit 66 and the blend processing unit 67.

The fixed pattern estimation unit 66 estimates (calculates) an offset c0 and a gain c1, which are correction parameters for correcting the characteristic variation (sensitivity difference) between taps by using the detection signals A0 to A3 and the detection signals B0 to B3 of the pixel to be processed, the movement amount diff of the object supplied from the movement estimation unit 64, and the amplitude amp supplied from the amplitude estimation unit 65.

The light receiving periods of the first tap 32A and the second tap 32B of the predetermined pixel 21 as the pixel to be processed are 180° out of phase. Therefore, the following relationship is established between the offset c0 and the gain c1 and the detection signals A0 to A3 and the detection signals B0 to B3 under ideal conditions.

$$B0 = c0 + c1 \cdot A2$$

$$B1 = c0 + c1 \cdot A3$$

$$B2 = c0 + c1 \cdot A0 \quad (9)$$

$$B3 = c0 + c1 \cdot A1$$

When the matrices A, x, and y are placed as follows,

[Formula 3]

$$A = \begin{bmatrix} 1 & A2 \\ 1 & A3 \\ 1 & A0 \\ 1 & A1 \end{bmatrix}$$

$$x = \begin{bmatrix} c0 \\ c1 \end{bmatrix}$$

$$y = \begin{bmatrix} B0 \\ B1 \\ B2 \\ B3 \end{bmatrix}$$

Formula (9) can be expressed as y=Ax, and thus, the matrix x, that is, the offset c0 and the gain c1 can be calculated by the following Formula (10) by the least squares method.

[Formula 4]

$$X = (A^T A)^{-1} A^T y \quad (10)$$

More strictly, the fixed pattern estimation unit 66 retains the current offset c0 and the gain c1, or updates to the newly calculated offset c0 and the gain c1 according to the movement amount diff of the object supplied from the movement estimation unit 64 and the amplitude amp supplied from the amplitude estimation unit 65. Details will be described later with reference to FIG. 10.

According to the movement amount diff and the amplitude amp, the blend processing unit 67 blends the I2 signal and the Q2 signal of the 2-phase method supplied from the 2-phase processing unit 62, and the I4 signal and the Q4 signal of the 4-phase method supplied from the 4-phase processing unit 63, and calculates the I signal and the Q signal after blending and supplies the I signal and the Q signal to the phase calculation unit 68.

Specifically, on the basis of the movement amount diff of the object supplied from the movement estimation unit 64, the blend processing unit 67 calculates a blend rate α_diff based on the movement amount diff by the following Formula (11).

[Formula 5]

$$\alpha\_diff = \begin{cases} 0 & (diff < dth0) \\ (diff - dth0)/(dth1 - dth0) & (dth0 \leq diff < dth1) \\ 1 & (dth1 \leq diff) \end{cases} \quad (11)$$

Figure 9:
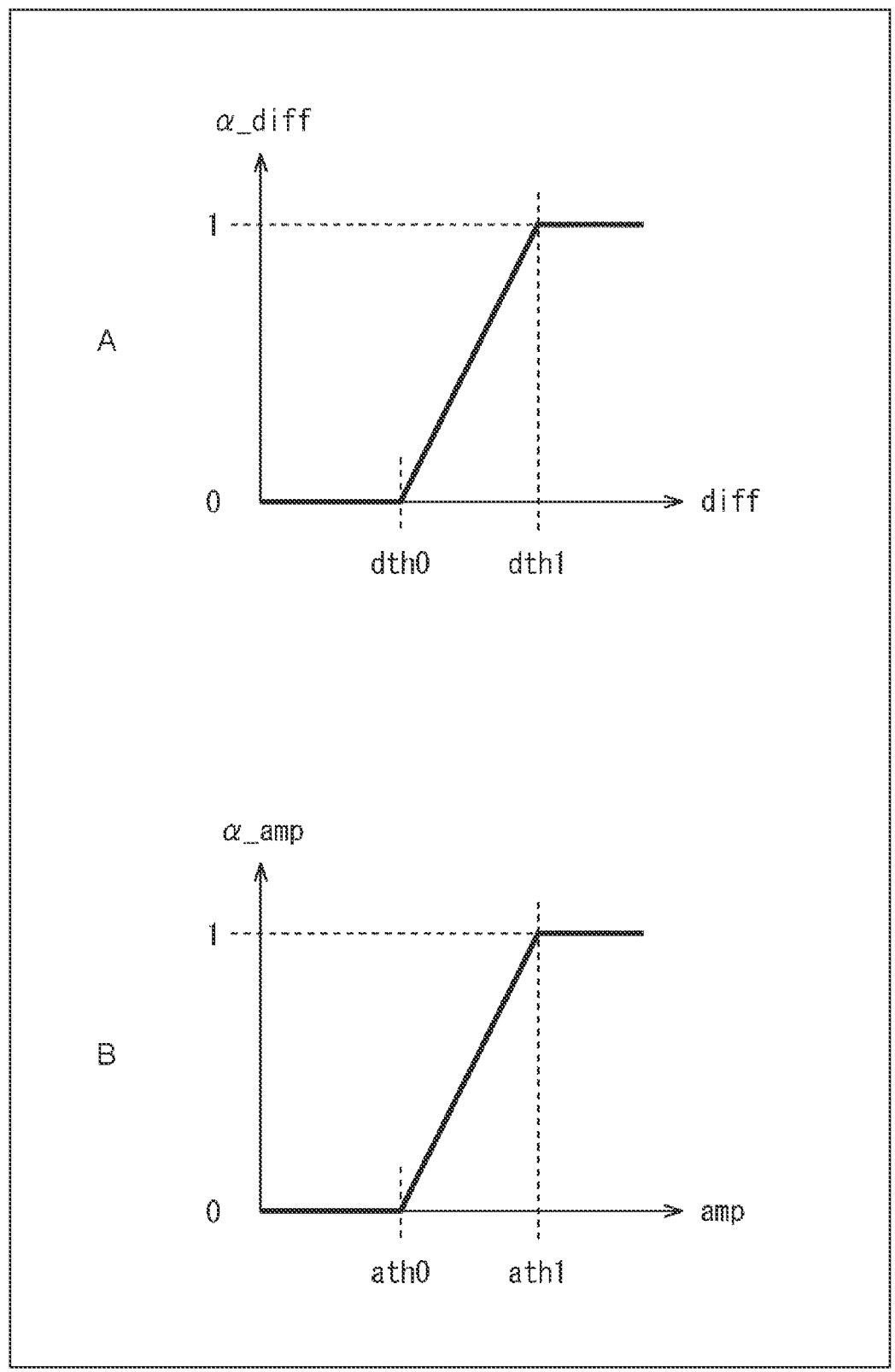
FIG. 9 is a diagram for describing a blend rate based on a movement amount and amplitude.

According to Formula (11), as shown in A of FIG. 9, in a case where the movement amount diff supplied from the movement estimation unit 64 is smaller than a first threshold value dth0, the blend rate α_diff=0 is set. In a case where the movement amount diff is equal to or greater than a second threshold value dth1, the blend rate α_diff=1 is set. In a case where the movement amount diff is equal to or greater than the first threshold value dth0 and less than the second threshold value dth1, the blend rate α_diff is linearly determined in the range of 0<α_diff<1.

Furthermore, on the basis of the amplitude amp supplied from the amplitude estimation unit 65, the blend processing unit 67 calculates the blend rate α_amp based on the amplitude amp by the following Formula (12).

[Formula 6]

$$\alpha\_amp = \begin{cases} 0 & (amp < ath0) \\ (amp - ath0)/(ath1 - ath0) & (ath0 \leq amp < ath1) \\ 1 & (ath1 \leq amp) \end{cases} \quad (12)$$

According to Formula (12), as shown in B of FIG. 9, in a case where the amplitude amp supplied from the amplitude estimation unit 65 is smaller than a first threshold value ath0, the blend rate α_amp=0 is set. In a case where the amplitude amp is equal to or greater than a second threshold value ath1, the blend rate α_amp=1 is set. In a case where the amplitude amp is equal to or greater than the first threshold value ath0 and less than the second threshold value ath1, the blend rate α_amp is linearly determined in the range of 0<α_amp<1.

Then, the blend processing unit 67 calculates the final blend rate α from the blend rate α_diff based on the movement amount diff and the blend rate α_amp based on the amplitude amp by either of the following Formula (12A) or (12B).

$$\alpha = \min(\alpha\_diff, \alpha\_amp) \quad (12A)$$

$$\alpha = \beta \cdot \alpha\_diff + (1-\beta) \cdot \alpha\_amp \quad (12B)$$

Note that β in Formula (12B) is a blend coefficient for blending the blend rate α_diff and the blend rate α_amp, and, for example, is set in advance.

The blend processing unit 67 calculates the I signal and the Q signal obtained by blending the I2 signal and the Q2 signal of the 2-phase method and the I4 signal and the Q4 signal of the 4-phase method by Formula (13) by using the calculated final blend rate α, and supplies the signals to the phase calculation unit 68.

$$I = \alpha \cdot I2 + (1-\alpha) \cdot I4$$

$$Q = \alpha \cdot Q2 + (1-\alpha) \cdot I4 \quad (13)$$

In a case where the movement amount diff is large, the blend processing unit 67 performs blending to increase the ratio of the I2 signal and the Q2 signal of the 2-phase method. In a case where the movement amount diff is small, the blend processing unit 67 performs blending to increase the ratio of the I4 signal and the Q4 signal of the 4-phase method with less noise. Furthermore, in a case where the amplitude amp is small (noisy), the blend processing unit 67 performs blending to increase the ratio of the I4 signal and the Q4 signal of the 4-phase method such that the SN ratio is improved.

The phase calculation unit 68 of FIG. 7 uses the I signal and the Q signal supplied from the blend processing unit 67 to calculate the depth value d, which is distance information to the object, by the above Formulas (1) and (2). As described with reference to FIG. 6, every time the detection signals A and B in two phases are updated, the phase calculation unit 68 calculates and outputs the depth value d (depth map) by using the latest detection signals A and B in four phases.

Figure 10:
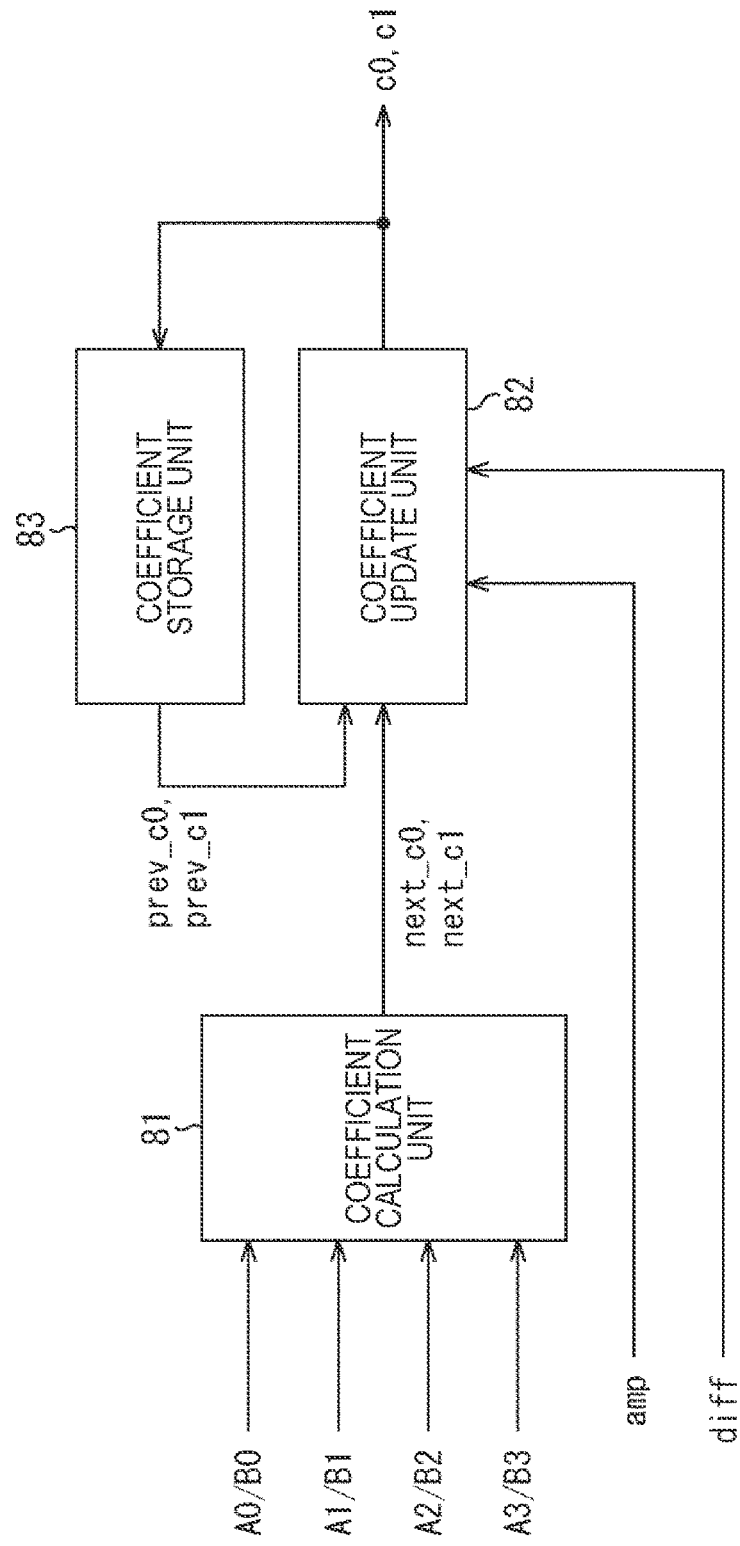
FIG. 10 is a block diagram showing a detailed configuration example of a fixed pattern estimation unit.

FIG. 10 is a block diagram showing a detailed configuration example of the fixed pattern estimation unit 66.

The fixed pattern estimation unit 66 includes a coefficient calculation unit 81, a coefficient update unit 82, and a coefficient storage unit 83.

The detection signals A0 to A3 and the detection signals B0 to B3 of the pixel to be processed from the light-receiving unit 14 are supplied to the coefficient calculation unit 81. The movement amount diff of the object from the movement estimation unit 64 and the amplitude amp of the detection signal from the amplitude estimation unit 65 are supplied to the coefficient update unit 82.

The coefficient calculation unit 81 calculates the matrix x, that is, the offset c0 and the gain c1 by the above Formula (10). The coefficient calculation unit 81 supplies the calculated offset c0 and the gain c1 to the coefficient update unit 82 as a new offset next_c0 and a new gain next_c1 as update candidates.

On the basis of the movement amount diff of the object supplied from the movement estimation unit 64, the coefficient update unit 82 calculates a blend rate u_diff based on the movement amount diff by the following Formula (14).

[Formula 7]

$$u\_diff = \begin{cases} 1 & (\mathit{diff} < \mathit{uth}0) \\ (\mathit{uth}1 - \mathit{diff})/(\mathit{uth}1 - \mathit{uth}0) & (\mathit{uth}0 \leq \mathit{diff} < \mathit{uth}1) \\ 0 & (\mathit{uth}1 \leq \mathit{diff}) \end{cases} \quad (14)$$

According to Formula (14), as shown in A of FIG. 11, in a case where the movement amount diff supplied from the movement estimation unit 64 is smaller than a first threshold value uth0, the blend rate u_diff=1 is set. In a case where the movement amount diff is equal to or greater than a second threshold value uth1, the blend rate u_diff=0 is set. In a case where the movement amount diff is equal to or greater than the first threshold value uth0 and less than the second threshold value uth1, the blend rate u_diff is linearly determined in the range of 0<u_diff<1.

Furthermore, on the basis of the amplitude amp supplied from the amplitude estimation unit 65, the coefficient update unit 82 calculates the blend rate u_amp based on the amplitude amp by the following Formula (15).

[Formula 8]

$$u\_amp = \begin{cases} 0 & (\mathit{amp} < \mathit{vth}0) \\ (\mathit{amp} - \mathit{vth}0)/(\mathit{vth}1 - \mathit{vth}0) & (\mathit{vth}0 \leq \mathit{amp} < \mathit{vth}1) \\ 1 & (\mathit{vth}1 \leq \mathit{amp}) \end{cases} \quad (15)$$

According to Formula (15), as shown in B of FIG. 11, in a case where the amplitude amp supplied from the amplitude estimation unit 65 is smaller than a first threshold value vth0, the blend rate u_amp=0 is set. In a case where the amplitude amp is equal to or greater than a second threshold value vth1, the blend rate u_amp=1 is set. In a case where the amplitude amp is equal to or greater than the first threshold value vth0 and less than the second threshold value vth1, the blend rate u_am is linearly determined in the range of 0<u_amp<1.

Then, the coefficient update unit 82 calculates the final blend rate u by the following Formula (16) from the blend rate u_diff based on the movement amount diff and the blend rate u_amp based on the amplitude amp.

$$u = \min(u\_diff, u\_amp) \quad (16)$$

Using the calculated final blend rate u, the coefficient update unit 82 blends the new offset next_c0 and the new gain next_c1 from the coefficient calculation unit 81 with a current offset prev_c0 and a gain prev_c1 from the coefficient storage unit 83, and calculates the updated offset c0 and the gain c1 by the following Formula (17).

$$c0 = u \cdot \text{next\_}c0 + (1-u) \cdot \text{prev\_}c0$$

$$c1 = u \cdot \text{next\_}c1 + (1-u) \cdot \text{prev\_}c1 \quad (17)$$

The coefficient update unit 82 supplies the calculated updated offset c0 and the gain c1 to the correction processing unit 61 (FIG. 7) and stores the offset c0 and the gain c1 in the coefficient storage unit 83.

The coefficient storage unit 83 stores the offset c0 and the gain c1 supplied from the coefficient update unit 82. Then, the offset c0 and the gain c1 stored in the coefficient storage unit 83 are supplied to the coefficient update unit 82 as the current offset prev_c0 and the gain prev_c1 before the update at the timing when the next new offset next_c0 and the new gain next_c1 are supplied from the coefficient calculation unit 81 to the coefficient update unit 82.

The new offset next_c0 and the new gain next_c1 to be calculated by the coefficient calculation unit 81 can be calculated with the highest accuracy in a case where the amplitude amp is large enough and the movement amount diff is small. In a case where the amplitude amp is large enough and the movement amount diff is small, the coefficient update unit 82 performs update by increasing the blend rate of the new offset next_c0 and the new gain next_c1. In a case where the amplitude amp is small or the movement amount diff is large, the coefficient update unit 82 increases the blend rate of the current offset prev_c0 and the gain prev_c1, sets the blend rate u to retain the current offset prev_c0 and the gain prev_c1, and calculates the updated offset c0 and the gain c1.

Note that in the above example, the coefficient update unit 82 updates the offset c0 and the gain c1 by using both the movement amount diff supplied from the movement estimation unit 64 and the amplitude amp supplied from the amplitude estimation unit 65, but may use only one of the movement amount diff or the amplitude amp to update the offset c0 and the gain c1. In that case, as the blend rate u of Formula (17), the blend rate u_diff based on the movement amount diff or the blend rate u_amp based on the amplitude amp is substituted.

<5. Depth Value Calculation Processing of Signal Processing Unit>

Figure 12:
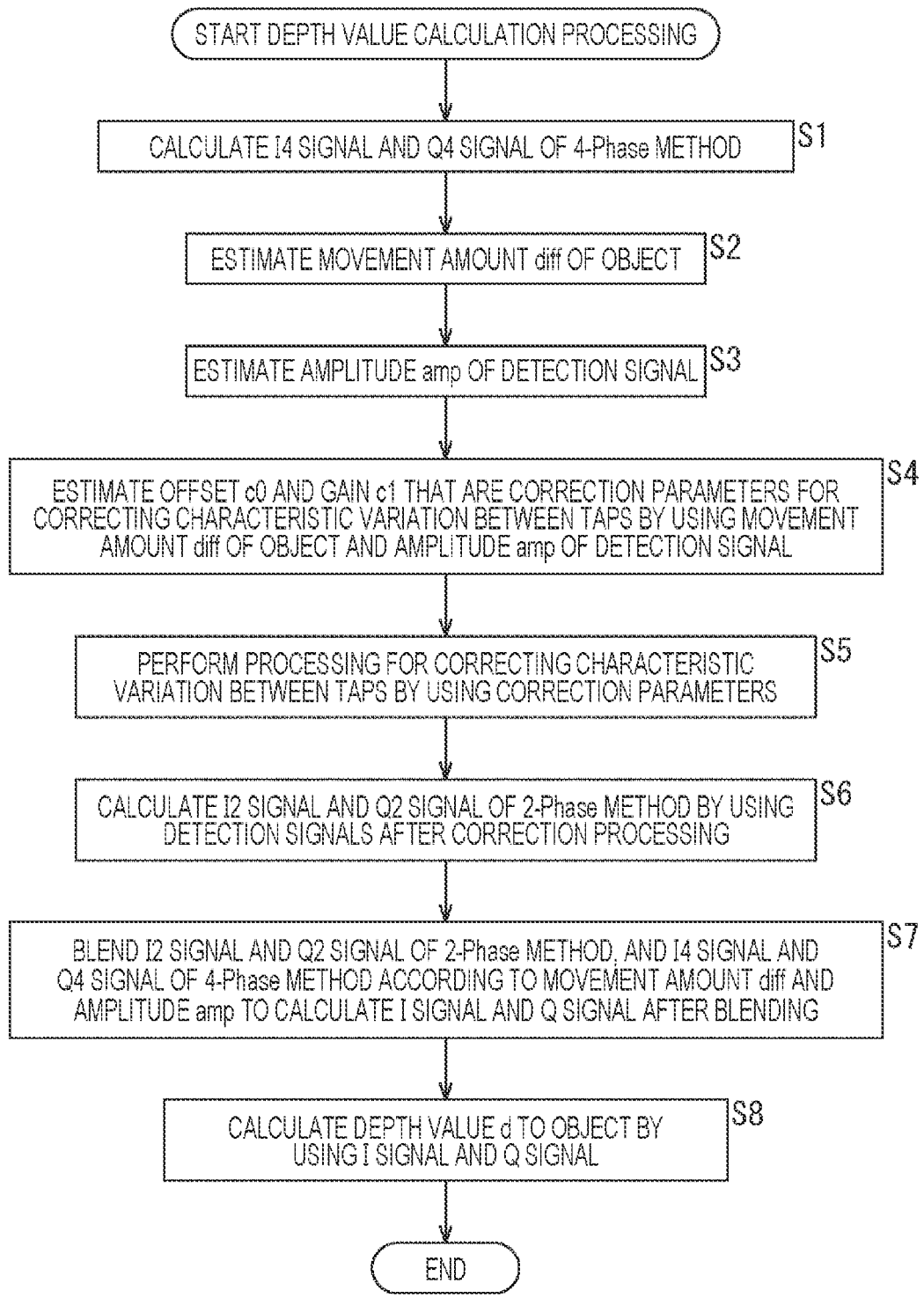
FIG. 12 is a flowchart for describing depth value calculation processing on a pixel to be processed by the signal processing unit.

Next, with reference to the flowchart of FIG. 12, depth value calculation processing for calculating the depth value of the pixel to be processed by the signal processing unit 15 will be described. This processing is started, for example, when the detection signals A0 to A3 and the detection signals B0 to B3 of the predetermined pixel 21 in the pixel array unit 22 as the pixel to be processed are supplied.

To begin with, in step S1, the 4-phase processing unit 63 calculates the I4 signal and the Q4 signal of the 4-phase method by Formula (3) by using the detection signals A0 to A3 and the detection signals B0 to B3 of the pixel to be processed supplied from the light-receiving unit 14. The calculated I4 signal and the Q4 signal of the 4-phase method are supplied to the blend processing unit 67.

In step S2, the movement estimation unit 64 estimates the movement amount diff of the object between sets of the set of phase 0° and phase 90° and the set of phase 180° and phase 270° by using the detection signals A0 to A3 and the detection signals B0 to B3 of the pixel to be processed. For example, one of diff0 to diff2 of Formula (7) is calculated as the movement amount diff. The movement estimation unit 64 supplies the estimated movement amount diff of the object to the fixed pattern estimation unit 66 and the blend processing unit 67.

In step S3, the amplitude estimation unit 65 estimates the amplitude amp of the detection signal of the pixel to be processed by calculating either of amp0 to amp3 of Formula (8). The amplitude estimation unit 65 supplies the estimated amplitude amp of the detection signals to the fixed pattern estimation unit 66 and the blend processing unit 67.

Steps S1 to S3 may be processed in different order or may be processed simultaneously.

In step S4, the fixed pattern estimation unit 66 estimates the offset c0 and the gain c1, which are correction parameters for correcting the characteristic variation between taps by using the detection signals A0 to A3 and the detection signals B0 to B3 of the pixel to be processed, the movement amount diff of the object supplied from the movement estimation unit 64, and the amplitude amp of the detection signal supplied from the amplitude estimation unit 65. The estimated offset c0 and the gain c1 are supplied to the correction processing unit 61.

In step S5, the correction processing unit 61 performs processing for correcting the characteristic variation between taps of the detection signal A of the first tap 32A and the detection signal B of the second tap 32B of the pixel to be processed by using the correction parameters supplied from the fixed pattern estimation unit 66. Specifically, the correction processing unit 61 performs processing for matching the detection signal B of the second tap 32B of the pixel to be processed with the detection signal A of the first tap 32A by Formula (6) using the offset c0 and the gain c1, which are the correction parameters supplied from the fixed pattern estimation unit 66. The detection signals A2' and B2' in phase 180° after the correction processing and the detection signals A3' and B3' in phase 270° are supplied to the 2-phase processing unit 62.

In step S6, the 2-phase processing unit 62 calculates the I2 signal and the Q2 signal of the 2-phase method by Formula (5) by using the detection signals A2' and B2' in phase 180° after the correction processing and the detection signals A3' and B3' in phase 270°. The calculated I2 signal and the Q2 signal are supplied to the blend processing unit 67.

In step S7, according to the movement amount diff and the amplitude amp, the blend processing unit 67 blends the I2 signal and the Q2 signal of the 2-phase method supplied from the 2-phase processing unit 62, and the I4 signal and the Q4 signal of the 4-phase method supplied from the 4-phase processing unit 63, and calculates the I signal and the Q signal after blending and supplies the I signal and the Q signal to the phase calculation unit 68.

In step S8, the phase calculation unit 68 uses the I signal and the Q signal supplied from the blend processing unit 67 to calculate the depth value d to the object by the above Formulas (1) and (2), and outputs the depth value d to the subsequent stage.

The processes of steps S1 to S8 described above are sequentially performed with each pixel of the pixel array unit 22 supplied from the light-receiving unit 14 as the pixel to be processed.

Since the movement amount diff of the object and the amplitude amp of the detection signal are different for each pixel of the pixel array unit 22, the I2 signal and the Q2 signal of the 2-phase method and the I4 signal and the Q4 signal of the 4-phase method supplied from the 4-phase processing unit 63 are blended at a blend rate α different for each pixel, and the I signal and the Q signal are calculated.

By the depth value calculation processing described above, in a case where the movement amount diff of the object is large, the depth value d is calculated by giving priority to the I2 signal and the Q2 signal of the 2-phase method, and in a case where the movement amount diff is small and the object is stationary, the depth value d is calculated by giving priority to the I4 signal and the Q4 signal of the 4-phase method. Furthermore, the characteristic variation (sensitivity difference) between taps, which is fixed pattern noise, is estimated from the detection signals in four phases, and is corrected by the correction processing unit 61. Therefore, the I2 signal and the Q2 signal of the two-phase processing can be calculated with high accuracy. With this configuration, the SN ratio can be improved. That is, the distance measurement accuracy can be improved.

Since the signal processing unit 15 outputs the depth value (depth map) every time the detection signals of two phases are received, a high frame rate can be achieved with a high SN ratio.

<6. Modifications of Driving by Distance-Measuring Module>

Figure 13:
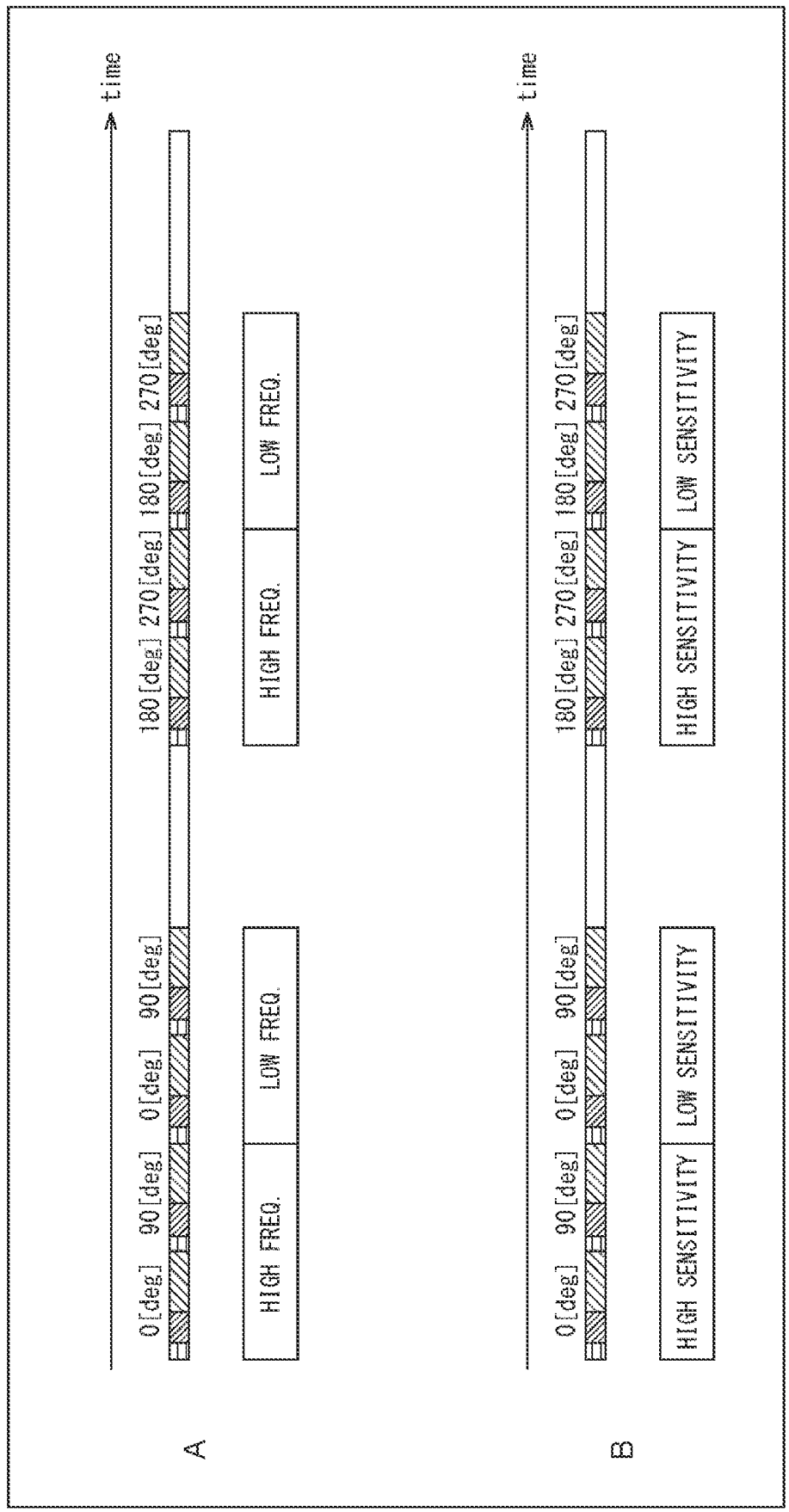
FIG. 13 is a diagram for describing a first modification and a second modification of driving.
Figure 14:
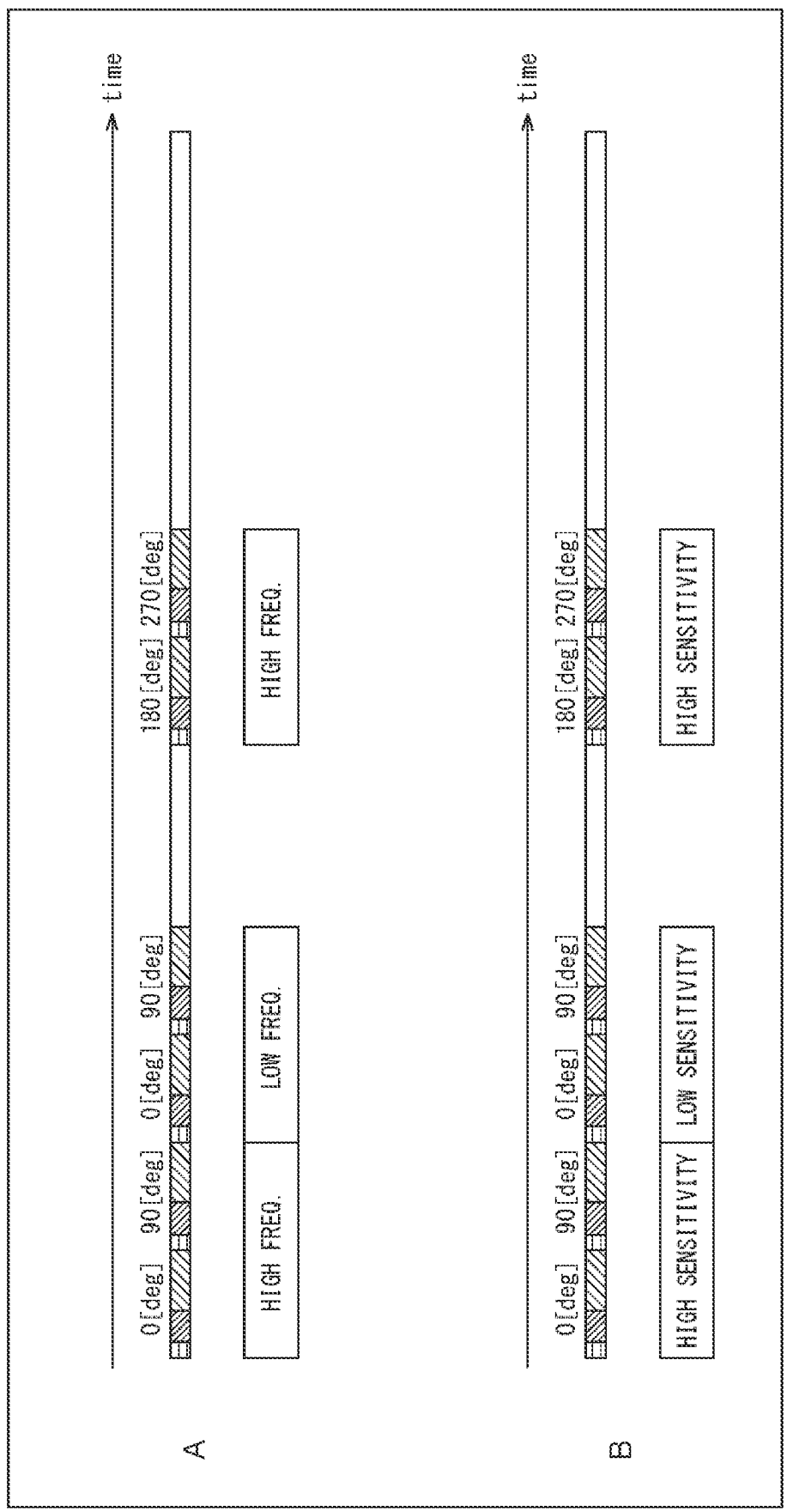
FIG. 14 is a diagram for describing the first modification and the second modification of driving.
Figure 15:
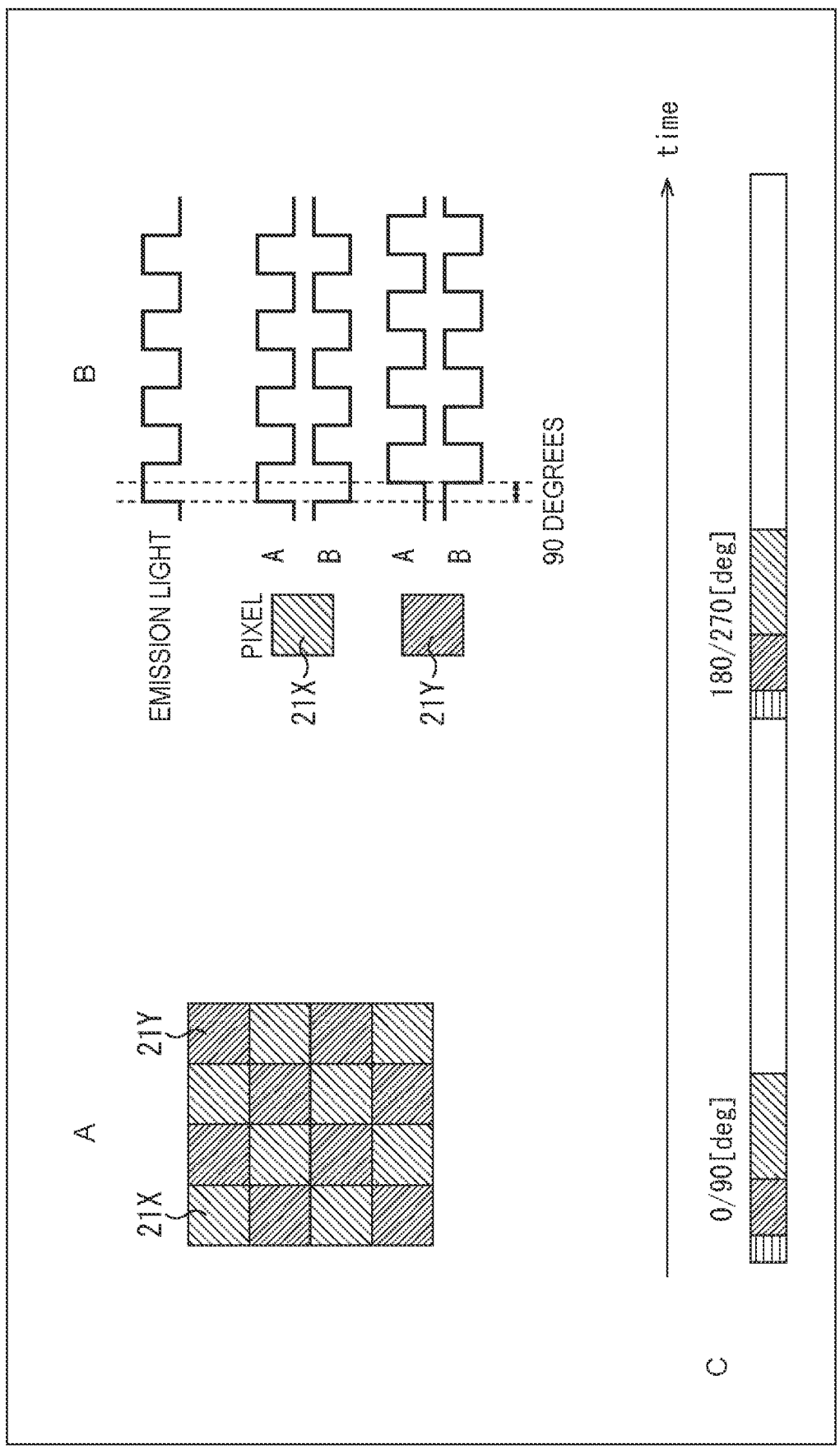
FIG. 15 is a diagram for describing a third modification of driving.

With reference to FIGS. 13 to 15, modifications of driving of the distance-measuring module 11 will be described. In addition to the above-described driving, the distance-measuring module 11 can selectively perform driving of the following first modification to third modification.

A of FIG. 13 shows the first modification of driving of the distance-measuring module 11.

In the embodiment described above, the light emission control unit 13 supplies, for example, the light emission control signal of a single frequency such as 20 MHz to the light-emitting unit 12, and the light-emitting unit 12 emits modulated light of a single frequency to the object.

In contrast, as shown in A of FIG. 13, the light emission control unit 13 causes the light-emitting unit 12 to emit the emission light at a plurality of frequencies, and causes the light-receiving unit 14 to receive light. In A of FIG. 13, the frequency of the modulated light to be emitted from the light-emitting unit 12 differs between "HIGH FREQ." and "LOW FREQ." "HIGH FREQ." is a high frequency such as, for example, 100 MHz, and "LOW FREQ." is a low frequency such as, for example, 20 MHz.

The light-receiving unit 14 receives, in order, first modulated light emitted at a high frequency and second modulated light emitted at a low frequency in two phases, phase 0° and phase 90°. Next, the light-receiving unit 14 receives, in order, first modulated light emitted at a high frequency and second modulated light emitted at a low frequency in two phases, phase 180° and phase 270°. The method of calculating the depth value at each frequency is similar to the embodiment described above.

The distance-measuring module 11 causes the light-emitting unit 12 to emit light at a plurality of frequencies, and causes the light-receiving unit 14 to receive light. The signal processing unit 15 performs the above-described depth value calculation processing. By calculating the depth value by using a plurality of frequencies, it is possible to eliminate the phenomenon (depth aliasing) in which a plurality of distances according to the modulation frequencies is determined to be the same.

B of FIG. 13 shows the second modification of driving of the distance-measuring module 11.

In the above-described embodiment, the light receiving period (exposure period) in which each pixel 21 of the light-receiving unit 14 receives the modulated light is set at a single time.

In contrast, as shown in B of FIG. 13, each pixel 21 can receive the modulated light by setting a plurality of light receiving periods (exposure periods). In B of FIG. 13, the light receiving period differs between "HIGH SENSITIVITY" and "LOW SENSITIVITY". "HIGH SENSITIVITY" is high sensitivity with the light receiving period set at a first light receiving period, and "LOW SENSITIVITY" is low sensitivity with the light receiving period set at a second light receiving period that is shorter than the first light receiving period.

The light-receiving unit 14 receives, in order, the modulated light emitted at a predetermined frequency in two phases, phase 0° and phase 90°, with high sensitivity and low sensitivity. Next, the light-receiving unit 14 receives, in order, the modulated light emitted at a predetermined frequency in two phases, phase 180° and phase 270°, with high sensitivity and low sensitivity. The method of calculating the depth value at each frequency is similar to the embodiment described above.

The distance-measuring module 11 causes the light-emitting unit 12 to emit light at a predetermined frequency, and causes the light-receiving unit 14 to receive light with two levels of sensitivity, high sensitivity and low sensitivity. The signal processing unit 15 performs the above-described depth value calculation processing. Light reception with high sensitivity enables measurement of a long distance, but light reception with low sensitivity is likely to cause saturation. By calculating the depth value by using a plurality of levels of sensitivity, the distance measurement range can be expanded.

In the example of B of FIG. 13, high-sensitivity detection and low-sensitivity detection are performed in the same two phases, but high-sensitivity detection and low-sensitivity detection may be performed in two different phases. Specifically, in the first place, driving may be performed to receive light with high sensitivity in two phases, phase 0° and phase 90°, to receive light with low sensitivity in two phases, phase 180° and phase 270°, to receive light with high sensitivity in two phases, phase 180° and phase 270°, and then to receive light with low sensitivity in two phases, phase 0° and phase 90°.

In both the first modification of driving described in A of FIG. 13 and the second modification of driving described in B of FIG. 13, detection is performed in four phases of phase 0°, phase 90°, phase 180°, and phase 270° at a plurality of frequencies or with a plurality of levels of sensitivity, but only detection in two phases may be performed either at a plurality of frequencies or with a plurality of levels of sensitivity.

For example, A of FIG. 14 shows an example in which, in driving at a plurality of frequencies shown in A of FIG. 13, for the second modulated light emitted at a low frequency, light reception in two phases of phase 180° and phase 270° is omitted, and detection in four phases is performed only at a high frequency.

Furthermore, B of FIG. 14 shows an example in which, in driving with a plurality of levels of sensitivity shown in B of FIG. 13, light reception in two phases of phase 180° and phase 270° with low sensitivity is omitted, and detection in four phases is performed only with high sensitivity.

In this way, the frame rate can be improved by performing detection only in two phases either at a plurality of frequencies or with a plurality of levels of sensitivity.

FIG. 15 shows the third modification of driving of the distance-measuring module 11.

In the embodiment described above, all the pixels 21 of the pixel array unit 22 of the light-receiving unit 14 are driven to perform detection at predetermined timing in the same phase of either phase 0°, phase 90°, phase 180°, or phase 270°.

In contrast, as shown in A of FIG. 15, the pixels 21 of the pixel array unit 22 may be classified checkerwise into pixels 21X and pixels 21Y, and may be driven to perform detection in different phases between the pixels 21X and the pixels 21Y.

For example, as shown in C of FIG. 15, the light-receiving unit 14 of the distance-measuring module 11 can be driven such that in a certain frame period, the pixel 21X of the pixel array unit 22 performs detection in phase 0°, while the pixel 21Y performs detection in phase 90°, and in the next frame period, the pixel 21X of the pixel array unit 22 performs detection in phase 180°, while the pixel 21Y performs detection in phase 270°. Then, the depth value is calculated by the above-described depth value calculation processing by using the detection signals in four phases obtained in the two frame periods.

The distance-measuring module 11 of FIG. 1 can be applied to, for example, a vehicle-mounted system mounted on a vehicle and measuring a distance to an object outside the vehicle. Furthermore, for example, the distance-measuring module 11 of FIG. 1 can be applied to a gesture recognition system and the like that measures a distance to an object including a user's hand and the like and recognizes the user's gesture on the basis of a measurement result thereof.

<7. Configuration Example of Electronic Device>

The distance-measuring module 11 described above can be mounted on an electronic device, for example, smartphones, tablet terminals, mobile phones, personal computers, game consoles, television receivers, wearable terminals, digital still cameras, digital video cameras, and the like.

FIG. 16 is a block diagram showing a configuration example of a smartphone as an electronic device equipped with the distance-measuring module.

As shown in FIG. 16, the smartphone 101 includes a distance-measuring module 102, an image capturing device 103, a display 104, a speaker 105, a microphone 106, a communication module 107, a sensor unit 108, a touch panel 109, and a control unit 110 connected via a bus 111. Furthermore, the control unit 110 has functions as an application processing unit 121 and an operation system processing unit 122 by a CPU executing a program.

The distance-measuring module 11 of FIG. 1 is applied to the distance-measuring module 102. For example, the distance-measuring module 102 is disposed on the front of the smartphone 101 and performs distance measurement on the user of the smartphone 101, thereby outputting the depth value of the surface shape of the user's face, hand, finger, and the like as a distance measurement result.

The image capturing device 103 is disposed on the front of the smartphone 101 and captures an image of the user of the smartphone 101 as a subject, thereby acquiring an image in which the user is captured. Note that although not illustrated, a configuration in which the image capturing device 103 is also disposed on the back of the smartphone 101 may be adopted.

The display 104 displays an operation screen for performing processing by the application processing unit 121 and the operation system processing unit 122, an image captured by the image capturing device 103, and the like. The speaker 105 and the microphone 106, for example, output the voice of the other party and pick up the voice of the user when talking over the smartphone 101.

The communication module 107 performs communication via a communication network. The sensor unit 108 senses speed, acceleration, proximity, and the like. The touch panel 109 acquires a touch operation by the user on the operation screen displayed on the display 104.

The application processing unit 121 performs processing for providing various services by the smartphone 101. For example, the application processing unit 121 can perform processing for creating a face that virtually reproduces the facial expression of the user by computer graphics on the basis of the depth supplied from the distance-measuring module 102, and displaying the face on the display 104. Furthermore, the application processing unit 121 can perform, for example, processing for creating three-dimensional shape data of an arbitrary three-dimensional object on the basis of the depth supplied from the distance-measuring module 102.

The operation system processing unit 122 performs processing for implementing basic functions and operations of the smartphone 101. For example, the operation system processing unit 122 can perform processing for authenticating the user's face and unlocking the smartphone 101 on the basis of the depth value supplied from the distance-measuring module 102. Furthermore, the operation system processing unit 122 can perform, for example, processing for recognizing the gesture of the user, and inputting various operations according to the gesture on the basis of the depth value supplied from the distance-measuring module 102.

The smartphone 101 configured in this way can achieve, for example, an improvement in a frame rate, a reduction in power consumption, and a reduction in a data transfer band by applying the distance-measuring module 11 described above. With this configuration, the smartphone 101 can create a face that moves more smoothly by computer graphics, perform facial authentication with high accuracy, reduce battery consumption, and transfer data in a narrow band.

<8. Configuration Example of Computer>

Next, a series of processes described above can be performed by hardware, or can be performed by software. In a case where the series of processes is performed by software, a program constituting the software is installed in a general purpose computer and the like.

Figure 17:
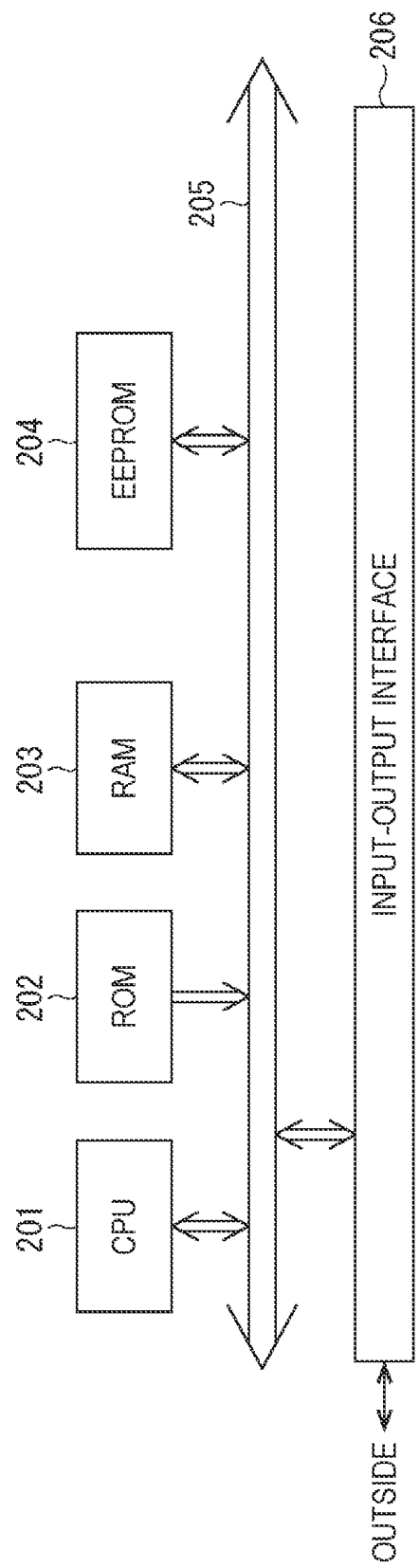
FIG. 17 is a block diagram showing a configuration example of one embodiment of a computer to which the present technology is applied.

FIG. 17 is a block diagram showing a configuration example of one embodiment of the computer in which the program that performs the above-described series of processes is installed.

In the computer, a central processing unit (CPU) 201, a read only memory (ROM) 202, a random access memory (RAM) 203, and an electronically erasable and programmable read only memory (EEPROM) 204 are interconnected by a bus 205. An input-output interface 206 is further connected to the bus 205, and the input-output interface 206 is connected to the outside.

In the computer configured as described above, the CPU 201 loads, for example, a program stored in the ROM 202 and the EEPROM 204 into the RAM 203 via the bus 205 and executes the program, whereby the above-described series of processes is performed. Furthermore, the program to be executed by the computer (CPU 201) can be installed or updated in the EEPROM 204 from the outside via the input-output interface 206 in addition to being written in the ROM 202 in advance.

With this configuration, the CPU 201 performs processing according to the flowchart described above, or processing to be performed according to the configuration of the block diagram described above. Then, the CPU 201 can output processing results thereof to the outside via, for example, the input-output interface 206 as necessary.

In the present specification, the processing performed by the computer according to the program does not necessarily have to be performed in chronological order in the order described as the flowchart. That is, the processing performed by the computer according to the program also includes processing performed in parallel or individually (for example, parallel processing or processing by an object).

Furthermore, the program may be processed by one computer (processor) or may be processed in a distributed manner by a plurality of computers. Moreover, the program may be transferred to a distant computer and executed.

<9. Example of Application to Mobile Object>

The technology according to the present disclosure (present technology) can be applied to various products. For example, the technology according to the present disclosure may be implemented as a device mounted on any type of mobile object including automobiles, electric vehicles, hybrid electric vehicles, motorcycles, bicycles, personal mobility, airplanes, drones, ships, robots, and the like.

Figure 18:
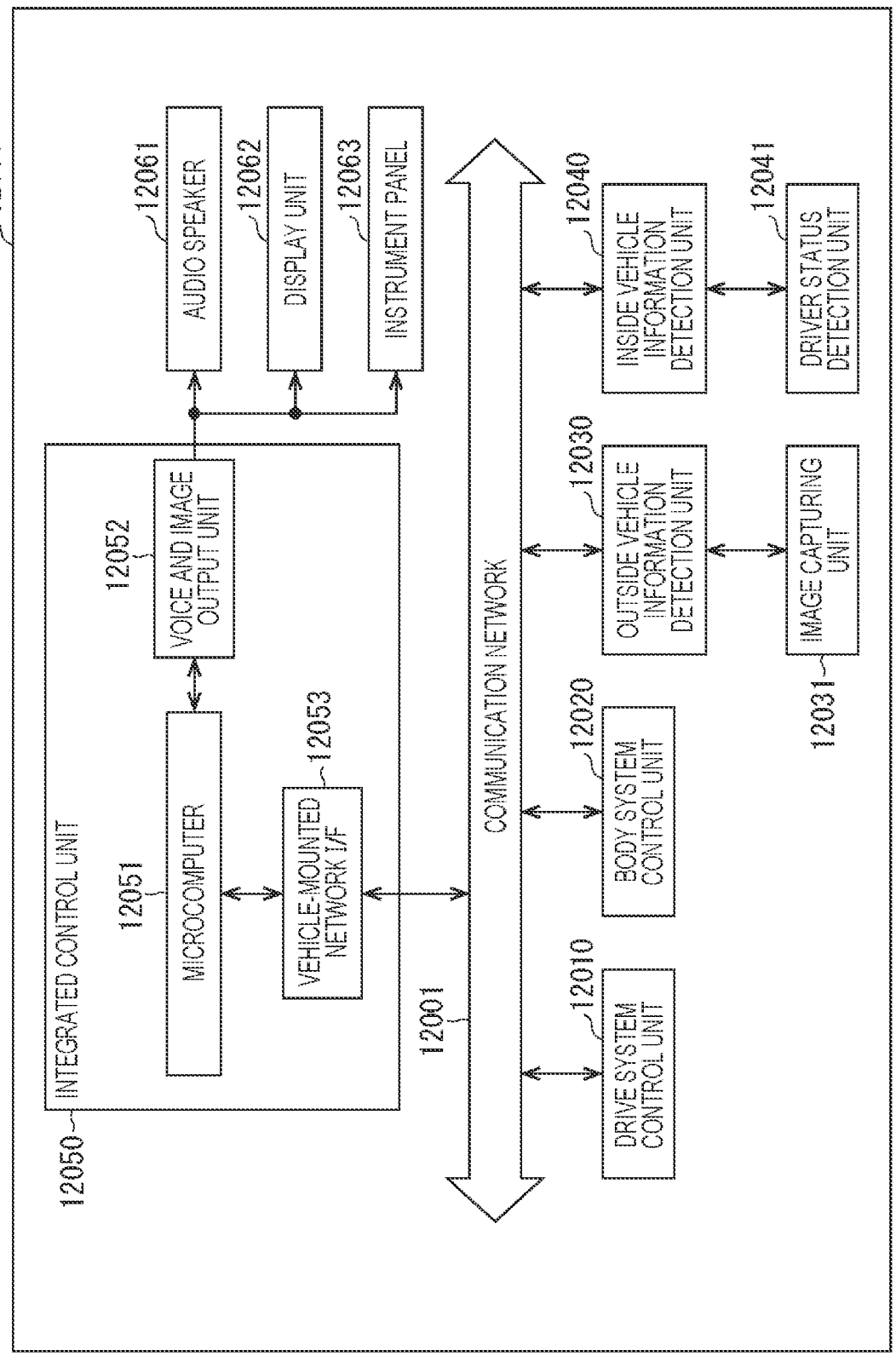
FIG. 18 is a block diagram showing one example of a schematic configuration of a vehicle control system.

FIG. 18 is a block diagram showing a schematic configuration example of a vehicle control system, which is one example of a mobile object control system to which the technology according to the present disclosure can be applied.

The vehicle control system 12000 includes a plurality of electronic control units connected via a communication network 12001. In the example shown in FIG. 18, the vehicle control system 12000 includes a drive system control unit 12010, a body system control unit 12020, an outside vehicle information detection unit 12030, an inside vehicle information detection unit 12040, and an integrated control unit 12050. Furthermore, as a functional configuration of the integrated control unit 12050, a microcomputer 12051, a voice and image output unit 12052, and a vehicle-mounted network interface (I/F) 12053 are illustrated.

The drive system control unit 12010 controls operations of devices related to the vehicle drive system according to various programs. For example, the drive system control unit 12010 functions as a control device of a driving force generation device for generating driving force of a vehicle such as an internal combustion engine or a driving motor, a driving force transmission mechanism for transmitting driving force to wheels, a steering mechanism for adjusting a steering angle of a vehicle, a braking device for generating braking force of a vehicle, and the like.

The body system control unit 12020 controls operations of various devices mounted on a vehicle body according to various programs. For example, the body system control unit 12020 functions as a control device of a keyless entry system, a smart key system, a power window device, or various lamps including a head lamp, a back lamp, a brake lamp, a direction indicator, a fog lamp, and the like. In this case, radio waves transmitted from a portable device replacing a key or signals from various switches can be input into the body system control unit 12020. The body system control unit 12020 receives the input of these radio waves or signals and controls a door lock device, the power window device, the lamps, and the like of the vehicle.

The outside vehicle information detection unit 12030 detects information outside the vehicle on which the vehicle control system 12000 is mounted. For example, an image capturing unit 12031 is connected to the outside vehicle information detection unit 12030. The outside vehicle information detection unit 12030 causes the image capturing unit 12031 to capture an image outside the vehicle, and receives the captured image. The outside vehicle information detection unit 12030 may perform object detection processing or distance detection processing on a person, a car, an obstacle, a sign, a character on a road surface, and the like on the basis of the received image.

The image capturing unit 12031 is an optical sensor that receives light and outputs an electric signal according to an amount of the received light. The image capturing unit 12031 can output the electric signal as an image or output the electric signal as distance measurement information. Furthermore, the light received by the image capturing unit 12031 may be visible light or invisible light including infrared rays and the like.

The inside vehicle information detection unit 12040 detects information inside the vehicle. For example, a driver status detection unit 12041 that detects the status of a driver is connected to the inside vehicle information detection unit 12040. The driver status detection unit 12041 may include, for example, a camera that captures images of the driver. The inside vehicle information detection unit 12040 may calculate the degree of fatigue or concentration of the driver on the basis of the detection information input from the driver status detection unit 12041, or determine that the driver is not dozing.

On the basis of information inside and outside the vehicle acquired by the outside vehicle information detection unit 12030 or the inside vehicle information detection unit 12040, the microcomputer 12051 can calculate a control target value for the driving force generating device, the steering mechanism, or the braking device, and output a control command to the drive system control unit 12010. For example, the microcomputer 12051 can perform cooperative control aimed at implementing functions of an advanced driver assistance system (ADAS) including vehicle collision avoidance or impact mitigation, follow-up driving based on distance between vehicles, driving while maintaining vehicle speed, vehicle collision warning, vehicle lane deviation warning, or the like.

Furthermore, by controlling the driving force generating device, the steering mechanism, the braking device, or the like on the basis of information around the vehicle acquired by the outside vehicle information detection unit 12030 or the inside vehicle information detection unit 12040, the microcomputer 12051 can perform cooperative control aimed at automatic driving and the like in which the vehicle travels autonomously without depending on the operation of the driver.

Furthermore, the microcomputer 12051 can output a control command to the body system control unit 12020 on the basis of information outside the vehicle acquired by the outside vehicle information detection unit 12030. For example, the microcomputer 12051 can perform cooperative control aimed at preventing glare such as controlling a headlamp according to the position of a preceding vehicle or an oncoming vehicle detected by the outside vehicle information detection unit 12030 and switching a high beam to a low beam.

The voice and image output unit 12052 transmits an output signal of at least one of a voice or an image to an output device that can visually or auditorily notifying an occupant of the vehicle or the outside of the vehicle of information. In the example of FIG. 18, an audio speaker 12061, a display unit 12062, and an instrument panel 12063 are illustrated as the output device. The display unit 12062 may include, for example, at least one of an on-board display and a head-up display.

Figure 19:
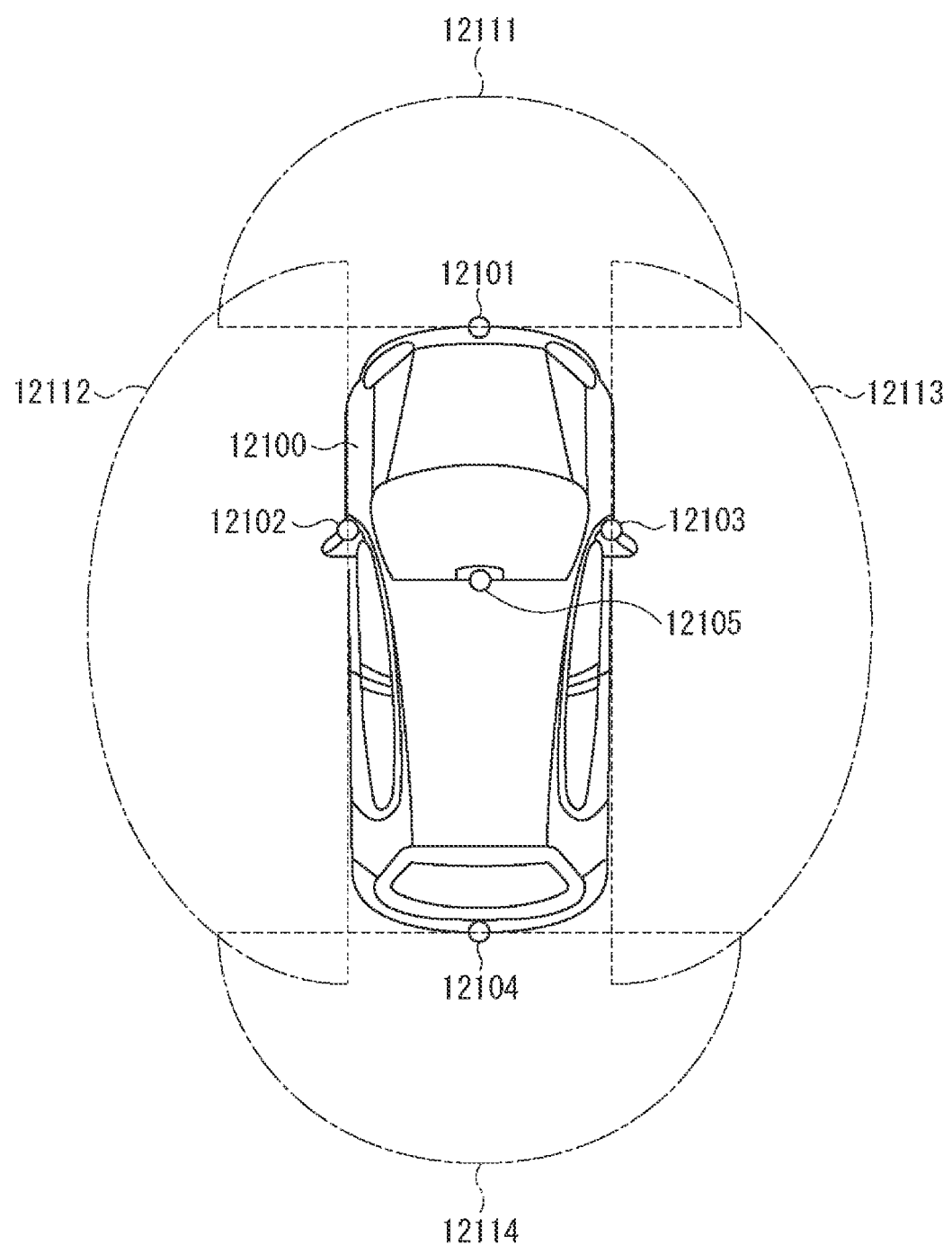
FIG. 19 is an explanatory diagram showing one example of installation positions of an outside vehicle information detection unit and an image capturing unit.

FIG. 19 is a diagram showing an example of an installation position of the image capturing unit 12031.

In FIG. 19, as the image capturing unit 12031, the vehicle 12100 includes image capturing units 12101, 12102, 12103, 12104, and 12105.

The image capturing units 12101, 12102, 12103, 12104, and 12105 are provided, for example, at positions such as a front nose, side mirrors, a rear bumper, a back door, and an upper part of a windshield in the vehicle compartment of the vehicle 12100. The image capturing unit 12101 provided in the front nose and the image capturing unit 12105 provided in the upper part of the windshield in the vehicle compartment mainly acquire an image ahead of the vehicle 12100. The image capturing units 12102 and 12103 provided in the side mirrors mainly acquire side images of the vehicle 12100. The image capturing unit 12104 provided in the rear bumper or back door mainly acquires an image behind the vehicle 12100. A front image captured by the image capturing units 12101 and 12105 is mainly used for detecting a preceding vehicle, a pedestrian, an obstacle, a traffic signal, a traffic sign, a lane, or the like.

Note that FIG. 19 shows one example of image capturing ranges of the image capturing units 12101 to 12104. The image capturing range 12111 indicates the image capturing range of the image capturing unit 12101 provided in the front nose. The image capturing ranges 12112 and 12113 indicate the image capturing ranges of the image capturing units 12102 and 12103 provided in the side mirrors, respectively. The image capturing range 12114 indicates the image capturing range of the image capturing unit 12104 provided in the rear bumper or the back door. For example, image data captured by the image capturing units 12101 to 12104 is superimposed, whereby a bird's-eye view image of the vehicle 12100 viewed from above is obtained.

At least one of the image capturing units 12101 to 12104 may have a function of acquiring distance information. For example, at least one of the image capturing units 12101 to 12104 may be a stereo camera including a plurality of image capturing elements or an image capturing element having pixels for detecting a phase difference.

For example, on the basis of the distance information obtained from the image capturing units 12101 to 12104, the microcomputer 12051 determines the distance to each three-dimensional object in the image capturing ranges 12111 to 12114 and the temporal change of the distance (relative speed with respect to the vehicle 12100), thereby particularly extracting, as a preceding vehicle, a three-dimensional object that is closest on a traveling path of the vehicle 12100 and travels at a predetermined speed (for example, 0 km/h or more) in the substantially same direction as the vehicle 12100. Moreover, the microcomputer 12051 can set a distance between vehicles to be secured before a preceding vehicle, and perform automatic brake control (including follow-up stop control), automatic acceleration control (including follow-up start control), and the like. In this way, cooperative control aimed at automatic driving and the like in which the vehicle autonomously travels without depending on the operation of the driver can be performed.

For example, on the basis of the distance information obtained from the image capturing units 12101 to 12104, the microcomputer 12051 classifies and extracts three-dimensional object data regarding three-dimensional objects into two-wheeled vehicles, ordinary vehicles, large vehicles, pedestrians, utility poles, and other three-dimensional objects, and can use the data for automatic obstacle avoidance. For example, the microcomputer 12051 discriminates obstacles around the vehicle 12100 between obstacles that can be visually recognized by the driver of the vehicle 12100 and obstacles that are difficult to be visually recognized. Then, the microcomputer 12051 determines the collision risk indicating the risk of collision with each obstacle. When the collision risk is equal to or higher than a set value and there is a possibility of collision, the microcomputer 12051 can provide driving assistance for collision avoidance by outputting an alarm to the driver via the audio speaker 12061 or the display unit 12062, or by performing forced deceleration or avoidance steering via the drive system control unit 12010.

At least one of the image capturing units 12101 to 12104 may be an infrared camera that detects infrared rays. For example, the microcomputer 12051 can recognize a pedestrian by determining whether or not a pedestrian exists in captured images of the image capturing units 12101 to 12104. Such pedestrian recognition is performed, for example, by a procedure for extracting feature points in the captured images of the image capturing units 12101 to 12104 serving as infrared cameras, and a procedure for performing pattern matching processing on a series of feature points indicating an outline of an object to determine whether or not the object is a pedestrian. When the microcomputer 12051 recognizes a pedestrian by determining that the pedestrian exists in the captured images of the image capturing units 12101 to 12104, the voice and image output unit 12052 controls the display unit 12062 such that a rectangular outline for emphasis is superimposed on the recognized pedestrian. Furthermore, the voice and image output unit 12052 may control the display unit 12062 to display an icon and the like indicating the pedestrian at a desired position.

One example of the vehicle control system to which the technology according to the present disclosure can be applied has been described above. The technology according to the present disclosure can be applied to the outside vehicle information detection unit 12030 and the inside vehicle information detection unit 12040 among the configurations described above. Specifically, by using the distance measurement by the distance-measuring module 11 as the outside vehicle information detection unit 12030 or the inside vehicle information detection unit 12040, it is possible to perform processing for recognizing the driver's gesture, perform various operations (for example, audio system, navigation system, air conditioning system) according to the gesture, and detect the driver's state more accurately. Furthermore, by using the distance measurement by the distance-measuring module 11, it is possible to recognize unevenness of a road surface and reflect the unevenness on control of a suspension.

Note that the present technology can be applied to the method of performing amplitude modulation on light projected onto an object, which is called continuous-wave method, out of the indirect ToF method. Furthermore, as the structure of the photodiode 31 of the light-receiving unit 14, the present technology can be applied to a distance-measuring sensor having a structure to distribute charges to two charge storage units, such as a current assisted photonic demodulator (CAPD) structure distance measuring sensor or a gate method distance-measuring sensor that alternately adds pulses and charges of the photodiode to the two gates.

The embodiment of the present technology is not limited to the embodiment described above, and various modifications may be made without departing from the spirit of the present technology.

The plurality of present technologies described above in this specification can be independently implemented independently as long as there is no contradiction. Of course, arbitrary plurality of the present technologies can be used in combination. For example, some or all of the present technology described in either of the embodiments can be combined with some or all of the present technology described in the other embodiment. Furthermore, it is also possible to implement some or all of the arbitrary present technologies described above in combination with other technologies not described above.

Furthermore, for example, the configuration described as one device (or processing unit) may be divided and configured as a plurality of devices (or processing units). On the contrary, the configurations described above as a plurality of devices (or processing units) may be collectively configured as one device (or processing unit). Furthermore, of course, a configuration other than the configuration described above may be added to the configuration of each device (or each processing unit). Moreover, if the configuration or operation of the entire system is substantially the same, a part of the configuration of one device (or processing unit) may be included in the configuration of another device (or other processing unit).

Moreover, in the present specification, the system means a set of a plurality of components (devices, modules (parts), and the like), and it does not matter whether or not all the components are in the same housing. Therefore, a plurality of devices housed in separate enclosures and connected via a network, and one device in which a plurality of modules is housed in one enclosure are a system.

Furthermore, for example, the program described above can be executed in an arbitrary device. In that case, the device is required at least to have necessary functions (functional blocks and the like) to be able to obtain necessary information.

It should be noted that effects described in the present specification are merely illustrative and not restrictive, and effects other than those described in the present specification may be produced.

Note that the present technology can have the following configurations.

(1)

A signal processing device including an estimation unit that estimates, in a pixel including a
first tap that detects a charge photoelectrically converted by a photoelectric conversion unit and a second tap that detects the charge photoelectrically converted by the photoelectric conversion unit, a sensitivity difference between taps of the first tap and the second tap by using first to fourth detection signals obtained by detecting reflected light generated by emission light reflected by an object in first to fourth phases with respect to the emission light.

(2)

The signal processing device according to (1) described above, in which
the estimation unit calculates an offset and a gain of the second tap with respect to the first tap as the sensitivity difference between taps.

(3)

The signal processing device according to (2) described above, in which
the estimation unit calculates the offset and the gain of the second tap with respect to the first tap on condition that phases of the first tap and the second tap are 180 degrees out of phase.

(4)

The signal processing device according to (2) or (3) described above, further including
an amplitude estimation unit that estimates amplitude of the first to fourth detection signals,
in which the estimation unit updates the offset and the gain by blending the calculated offset and the gain with the current offset and the gain on the basis of the estimated amplitude.

(5)

The signal processing device according to any one of (2) to (4) described above, further including
a movement amount estimation unit that estimates a movement amount of the object in the pixel,
in which the estimation unit updates the offset and the gain by blending the calculated offset and the gain with the current offset and the gain on the basis of the estimated amplitude and the movement amount.

(6)

The signal processing device according to any one of (1) to (5) described above, further including
a correction processing unit that performs correction processing for correcting the first and second detection signals that are latest two of the first to fourth detection signals by using a parameter with which the sensitivity difference is estimated.

(7)

The signal processing device according to (6) described above, further including:
a 2-phase processing unit that calculates an I signal and a Q signal of a 2-phase method by using the first and second detection signals after the correction processing;
a 4-phase processing unit that calculates an I signal and a Q signal of a 4-phase method by using the first to fourth detection signals;
a blend processing unit that blends the I signal and the Q signal of the 2-phase method with the I signal and the Q signal of the 4-phase method, and calculates an I signal and a Q signal after the blending; and
a calculation unit that calculates distance information to the object on the basis of the I signal and the Q signal after the blending.

(8)

The signal processing device according to (7) described above, in which
the blend processing unit blends the I signal and the Q signal of the 2-phase method with the I signal and the Q signal of the 4-phase method on the basis of amplitude of the first to fourth detection signals and a movement amount of the object in the pixel.

(9)

The signal processing device according to (7) or (8) described above, in which
the calculation unit calculates the distance information to the object every time detection signals of two phases of the first to fourth detection signals are updated.

(10)

A signal processing method including, by a signal processing device:
estimating, in a pixel including a first tap that detects a charge photoelectrically converted by a photoelectric conversion unit and a second tap that detects the charge photoelectrically converted by the photoelectric conversion unit, a sensitivity difference between taps of the first tap and the second tap by using a first to fourth detection signals obtained by detecting reflected light generated by emission light reflected by an object in first to fourth phases with respect to the emission light.

(11)

A distance-measuring module including
a light-receiving unit in which pixels each including a first tap that detects a charge photoelectrically converted by a photoelectric conversion unit and a second tap that detects the charge photoelectrically converted by the photoelectric conversion unit are two-dimensionally arranged; and a signal processing unit including an estimation unit that estimates a sensitivity difference between taps of the first tap and the second tap in the pixels by using first to fourth detection signals obtained by detecting reflected light generated by emission light reflected by an object in first to fourth phases with respect to the emission light.

(12)

The distance-measuring module according to (11) described above, in which
each of the pixels receives the reflected light obtained by emitting the emission light at a plurality of frequencies, and
the estimation unit estimates the sensitivity difference between taps at each of the plurality of frequencies.

(13)

The distance-measuring module according to (11) or (12) described above, in which
each of the pixels receives the reflected light obtained by emitting the emission light at a plurality of exposure times, and
the estimation unit estimates the sensitivity difference between taps at each of the plurality of exposure times.

(14)

The distance-measuring module according to any one of (11) to (13) described above, in which
the light-receiving unit is driven to cause a first pixel to receive the reflected light in the first phase and to cause a second pixel to receive the reflected light in the second phase simultaneously, next, to cause the first pixel to receive the reflected light in the third phase and to cause the second pixel to receive the reflected light in the fourth phase simultaneously, and the estimation unit estimates the sensitivity difference between taps of the first tap and the second tap by using the first to fourth detection signals detected in the first to fourth phases.

REFERENCE SIGNS LIST

11 Distance-measuring module
13 Light emission control unit
14 Light-receiving unit
15 Signal processing unit
21 Pixel
18 Reference signal generation unit
18a, 18b DAC
18c Control unit
21 Pixel
22 Pixel array unit
23 Drive control circuit
31 Photodiode
32A First tap
32B Second tap
61 Correction processing unit
62 2-phase processing unit
63 4-phase processing unit
64 Movement estimation unit
65 Amplitude estimation unit
66 Fixed pattern estimation unit
67 Blend processing unit
68 Phase calculation unit
81 Coefficient calculation unit
82 Coefficient update unit
83 Coefficient storage unit
101 Smartphone
102 Distance-measuring module
201 CPU
202 ROM
203 RAM

The invention claimed is:

1. A signal processing device comprising
an estimation unit that estimates, in a pixel including a first tap that detects a charge photoelectrically converted by a photoelectric conversion unit and a second tap that detects the charge photoelectrically converted by the photoelectric conversion unit, a sensitivity difference between taps of the first tap and the second tap by using first to fourth detection signals obtained by detecting reflected light generated by emission light reflected by an object in first to fourth phases with respect to the emission light,
wherein the estimation unit calculates an offset and a gain of the second tap with respect to the first tap as the sensitivity difference between taps, and
wherein the estimation unit is implemented via at least one processor.

2. The signal processing device according to claim 1, wherein
the estimation unit calculates the offset and the gain of the second tap with respect to the first tap on condition that phases of the first tap and the second tap are 180 degrees out of phase.

3. The signal processing device according to claim 1, further comprising
an amplitude estimation unit that estimates amplitude of the first to fourth detection signals, wherein the estimation unit updates the offset and the gain by blending the calculated offset and the gain with the current offset and the gain on a basis of the estimated amplitude, and
wherein the amplitude estimation unit is implemented via at least one processor.

4. The signal processing device according to claim 3, further comprising
a movement amount estimation unit that estimates a movement amount of the object in the pixel,
wherein the estimation unit updates the offset and the gain by blending the calculated offset and the gain with the current offset and the gain on a basis of the estimated amplitude and the movement amount, and
wherein the movement amount estimation unit is implemented via at least one processor.

5. The signal processing device according to claim 1, further comprising
a correction processing unit that performs correction processing for correcting the first and second detection signals that are latest two of the first to fourth detection signals by using a parameter with which the sensitivity difference is estimated, and
wherein the correction processing unit is implemented via at least one processor.

6. A signal processing device comprising:
an estimation unit that estimates, in a pixel including a first tap that detects a charge photoelectrically converted by a photoelectric conversion unit and a second tap that detects the charge photoelectrically converted by the photoelectric conversion unit, a sensitivity difference between taps of the first tap and the second tap by using first to fourth detection signals obtained by detecting reflected light generated by emission light reflected by an object in first to fourth phases with respect to the emission light,
a 2-phase processing unit that calculates an I signal and a Q signal of a 2-phase method by using the first and second detection signals after the correction processing;
a 4-phase processing unit that calculates an I signal and a Q signal of a 4-phase method by using the first to fourth detection signals;
a blend processing unit that blends the I signal and the Q signal of the 2-phase method with the I signal and the Q signal of the 4-phase method, and calculates an I signal and a Q signal after the blending; and
a calculation unit that calculates distance information to the object on a basis of the I signal and the Q signal after the blending,
wherein the estimation unit, the 2-phase processing unit, the 4-phase processing unit, the blend processing unit, and the calculation unit are each implemented via at least one processor.

7. The signal processing device according to claim 6, wherein
the blend processing unit blends the I signal and the Q signal of the 2-phase method with the I signal and the Q signal of the 4-phase method on a basis of amplitude of the first to fourth detection signals and a movement amount of the object in the pixel.

8. The signal processing device according to claim 6, wherein
the calculation unit calculates the distance information to the object every time detection signals of two phases of the first to fourth detection signals are updated.

9. A signal processing method comprising, by a signal processing device:
  estimating, in a pixel including a first tap that detects a charge photoelectrically converted by a photoelectric conversion unit and a second tap that detects the charge photoelectrically converted by the photoelectric conversion unit, a sensitivity difference between taps of the first tap and the second tap by using first to fourth detection signals obtained by detecting reflected light generated by emission light reflected by an object in first to fourth phases with respect to the emission light; and
  calculating an offset and a gain of the second tap with respect to the first tap as the sensitivity difference between taps.

10. A distance-measuring module comprising
  a light-receiving unit in which pixels each including a first tap that detects a charge photoelectrically converted by a photoelectric conversion unit and a second tap that detects the charge photoelectrically converted by the photoelectric conversion unit are two-dimensionally arranged; and a signal processing unit including an estimation unit that estimates a sensitivity difference between taps of the first tap and the second tap in the pixels by using first to fourth detection signals obtained by detecting reflected light generated by emission light reflected by an object in first to fourth phases with respect to the emission light,
  wherein the light-receiving unit is driven to cause a first pixel to receive the reflected light in the first phase and to cause a second pixel to receive the reflected light in the second phase simultaneously, next, to cause the first pixel to receive the reflected light in the third phase and to cause the second pixel to receive the reflected light in the fourth phase simultaneously,
  wherein the estimation unit estimates the sensitivity difference between taps of the first tap and the second tap by using the first to fourth detection signals detected in the first to fourth phases, and
  wherein the signal processing unit is implemented via at least one processor.

11. The distance-measuring module according to claim 10, wherein
  each of the pixels receives the reflected light obtained by emitting the emission light at a plurality of frequencies, and
  the estimation unit estimates the sensitivity difference between taps at each of the plurality of frequencies.

12. The distance-measuring module according to claim 10, wherein
  each of the pixels receives the reflected light obtained by emitting the emission light at a plurality of exposure times, and
  the estimation unit estimates the sensitivity difference between taps at each of the plurality of exposure times.

* * * * *